United States Patent
Nishi et al.

(10) Patent No.: US 12,432,379 B2
(45) Date of Patent: Sep. 30, 2025

(54) ENCODING METHOD, DECODING METHOD, ENCODING DEVICE, AND DECODING DEVICE

(71) Applicant: Panasonic Intellectual Property Corporation of America, Torrance, CA (US)

(72) Inventors: Takahiro Nishi, Nara (JP); Toshiyasu Sugio, Osaka (JP); Noritaka Iguchi, Osaka (JP); Chung Dean Han, Johor Bahru (MY); Keng Liang Loi, Singapore (SG); Zheng Wu, Singapore (SG)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 19 days.

(21) Appl. No.: 18/394,355

(22) Filed: Dec. 22, 2023

(65) Prior Publication Data

US 2024/0129530 A1    Apr. 18, 2024

Related U.S. Application Data

(63) Continuation of application No. PCT/JP2022/024903, filed on Jun. 22, 2022.
(Continued)

(51) Int. Cl.
*H04N 19/597*    (2014.01)
*H04N 19/105*    (2014.01)

(52) U.S. Cl.
CPC ......... *H04N 19/597* (2014.11); *H04N 19/105* (2014.11)

(58) Field of Classification Search
CPC ............................ H04N 19/597; H04N 19/105
(Continued)

(56) References Cited

U.S. PATENT DOCUMENTS

2014/0375638 A1    12/2014    Tomaru et al.
2019/0108655 A1*    4/2019    Lasserre ................. G06T 15/04
(Continued)

FOREIGN PATENT DOCUMENTS

WO    2014/020663    2/2014

OTHER PUBLICATIONS

International Search Report (ISR) issued on Aug. 23, 2022 in International (PCT) Application No. PCT/JP2022/024903.
(Continued)

*Primary Examiner* — Allen C Wong
(74) *Attorney, Agent, or Firm* — Wenderoth, Lind & Ponack, L.L.P.

(57) ABSTRACT

An encoding method for encoding three-dimensional points each having a position represented by a distance and an angle, the encoding method comprising: identifying three-dimensional points that belong to a second processing unit and have been encoded, for inter prediction of a first three-dimensional point belonging to a first processing unit; and selecting a reference three-dimensional point from the three-dimensional points identified to calculate an inter predicted value of the first three-dimensional point. The three-dimensional points identified include a second three-dimensional point and a third three-dimensional point, the second three-dimensional point having a second angle corresponding to a first angle of the first three-dimensional point, the third three-dimensional point having a third angle greater than the second angle.

12 Claims, 14 Drawing Sheets

Related U.S. Application Data

(60) Provisional application No. 63/218,057, filed on Jul. 2, 2021.

(58) Field of Classification Search
USPC .................................................. 375/240.12
See application file for complete search history.

(56) References Cited

U.S. PATENT DOCUMENTS

2022/0337872 A1* 10/2022 Park ................. H04N 19/172
2023/0023219 A1* 1/2023 Kato ................. H04N 19/597

OTHER PUBLICATIONS

Extended European Search Report issued Nov. 28, 2024 in corresponding European Patent Application No. 22832968.6.
"Technologies under consideration in G-PCC", ISO/IEC JTC 1/SC 29/WG 7, Serial No. 20374, May 2021.
Keng Liang Loi et al., "[G-PCC][New] Inter Prediction for Improved Quantization of Azimuthal Angle in Predictive Geometry Coding", ISO/IEC JTC 1/SC 29/WG 7, No. m57351, Jul. 2021.

* cited by examiner

FIG. 13

| geometry_prediction_tree_node( ) { | Descriptor |
|---|---|
| ... | |
| if( InterFrameFlag ) | |
| intra_pred_flag | ae(v) |
| if( intra_pred_flag ) | |
| pred_mode | ae(v) |
| else{ | |
| if(NumRefFrames>1) | |
| inter_ref_frame_idx | ae(v) |
| if( NumRefPoints>1 ) | |
| inter_ref_point_idx | ae(v) |
| } | |
| for( i = 0; i < 3; i++ ) | |
| 1st_residual_value[ i ] | ae(v) |
| if( gps_coordinate_trans_enabled_flag ) | |
| for( i = 0; i < 3; i++ ) | |
| 2nd_residual_value[ i ] | ae(v) |
| ... | |
| } | |

ENCODING METHOD, DECODING METHOD, ENCODING DEVICE, AND DECODING DEVICE

CROSS REFERENCE TO RELATED APPLICATIONS

This application is a U.S. continuation application of PCT International Patent Application Number PCT/JP2022/024903 filed on Jun. 22, 2022, claiming the benefit of priority of U.S. Provisional Patent Application No. 63/218,057 filed on Jul. 2, 2021, the entire contents of which are hereby incorporated by reference.

FIELD

The present disclosure relates to an encoding method, a data decoding method, an encoding device, and a decoding device.

BACKGROUND

Devices or services utilizing three-dimensional data are expected to find their widespread use in a wide range of fields, such as computer vision that enables autonomous operations of cars or robots, map information, monitoring, infrastructure inspection, and video distribution. Three-dimensional data is obtained through various means including a distance sensor such as a rangefinder, as well as a stereo camera and a combination of a plurality of monocular cameras.

Methods of representing three-dimensional data include a method known as a point cloud scheme that represents the shape of a three-dimensional structure by a point cloud in a three-dimensional space. In the point cloud scheme, the positions and colors of a point cloud are stored. While point cloud is expected to be a mainstream method of representing three-dimensional data, a massive amount of data of a point cloud necessitates compression of the amount of three-dimensional data by encoding for accumulation and transmission, as in the case of a two-dimensional moving picture (examples include Moving Picture Experts Group-4 Advanced Video Coding (MPEG-4 AVC) and High Efficiency Video Coding (HEVC) standardized by MPEG).

Meanwhile, point cloud compression is partially supported by, for example, an open-source library (Point Cloud Library) for point cloud-related processing.

Furthermore, a technique for searching for and displaying a facility located in the surroundings of the vehicle by using three-dimensional map data is known (see, for example, Patent Literature (PTL) 1).

Citation List

PATENT LITERATURE

PTL 1 International Publication WO 2014/020663

SUMMARY

Technical Problem

There has been a demand for improving coding efficiency in a three-dimensional data encoding process and a three-dimensional data decoding process.

The present disclosure has an object to provide an encoding method, a decoding method, an encoding device, or a device that may be capable of improving coding efficiency.

Solution to Problem

An encoding method according to an aspect of the present disclosure is an encoding method for encoding three-dimensional points each having a position represented by a distance and an angle, and includes: identifying three-dimensional points that belong to a second processing unit and have been encoded, for inter prediction of a first three-dimensional point belonging to a first processing unit; and selecting a reference three-dimensional point from the three-dimensional points identified to calculate an inter predicted value of the first three-dimensional point, wherein the three-dimensional points identified include a second three-dimensional point and a third three-dimensional point, the second three-dimensional point having a second angle corresponding to a first angle of the first three-dimensional point, the third three-dimensional point having a third angle greater than the second angle.

Advantageous Effects

The present disclosure can provide an encoding method, or the like, that may be capable of improving coding efficiency.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 13 illustrates an example of a syntax for a three-dimensional point according to the embodiment.

DESCRIPTION OF EMBODIMENTS

Figure 1:
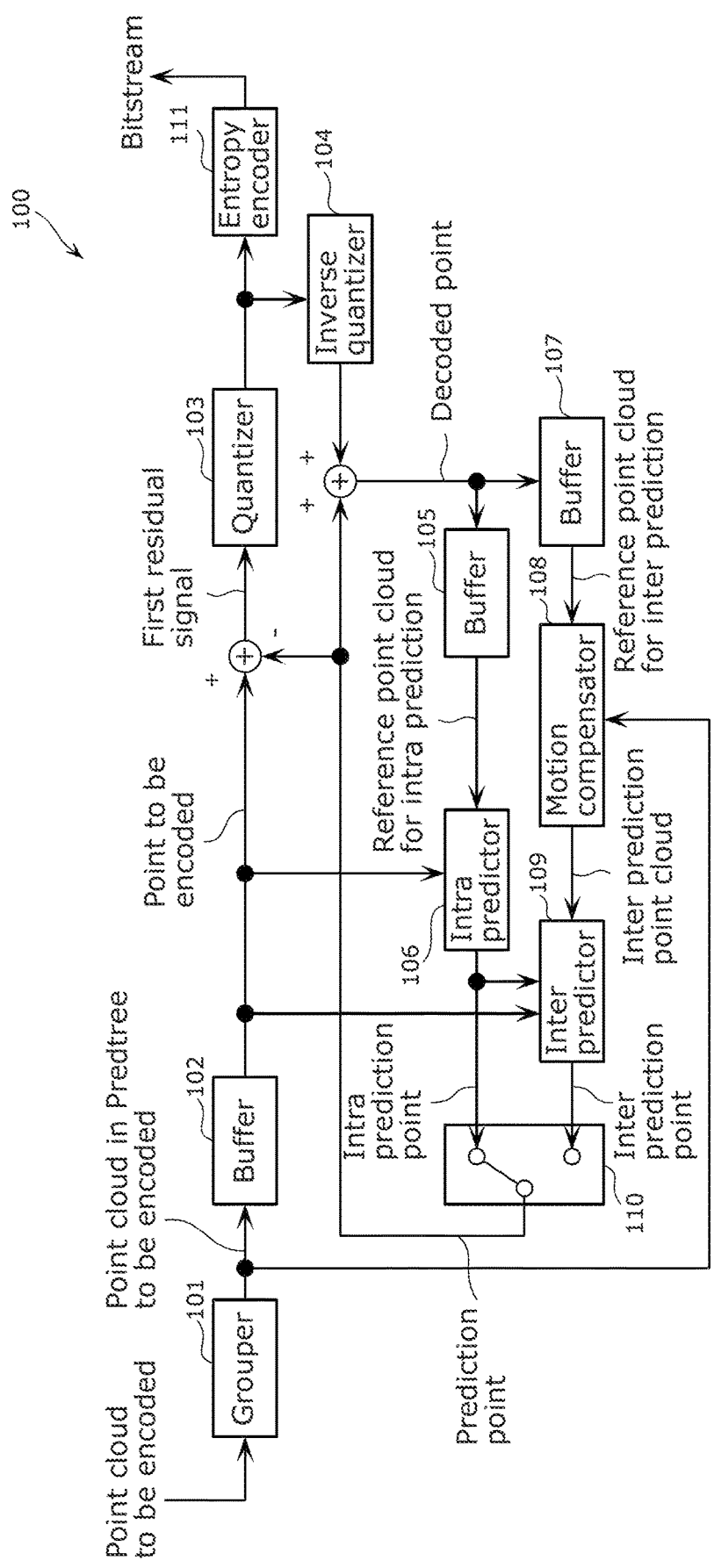
FIG. 1 is a block diagram of a three-dimensional data encoding device according to an embodiment.

A three-dimensional data encoding method according to an aspect of the present disclosure includes: selecting, from among encoded three-dimensional points, an inter prediction point of a first three-dimensional point among three-dimensional points, the three-dimensional points each having a position represented by a distance component and a first angle component; and encoding a residual between a position of the first three-dimensional point and a position of the inter prediction point. Here, the encoded three-dimensional points include a third three-dimensional point that is after a second three-dimensional point in encoding order, and a second angle represented by a first angle component of the second three-dimensional point corresponds to a first angle represented by a first angle component of the first three-dimensional point.

In other words, with this aspect, it may be possible to select, as the inter prediction point, a third three-dimensional point that is subsequent in encoding order to a second three-dimensional point that has an angle corresponding to the angle of the first three-dimensional point to be encoded. Accordingly, it may be possible to reduce a distance residual. However, the position residual may be the residual of the second angle component or may be both the distance residual and the residual of the second angle composition.

Furthermore, a total number of the encoded three-dimensional points may be two.

Accordingly, since it is possible to have two points as candidates of the inter prediction point, the processing amount of the process of selecting one inter prediction point from among the two encoded three-dimensional points can be reduced.

Furthermore, the third three-dimensional point may be one place after the second three-dimensional point in encoding order.

With this aspect, it is highly likely that a third three-dimensional point located at a position corresponding to an angle that is close to the angle of the first three-dimensional point will be selected as an inter prediction point. Therefore, with this aspect, it may be possible to further reduce the position residual.

Furthermore, the three-dimensional points may each be represented by the distance component, the first angle component, and a second angle component. Here, the first angle component may be a horizontal angle component and the second angle component may be an elevation angle component. Furthermore, the second angle component may be common to the first three-dimensional point, the second three-dimensional point, and the third three-dimensional point.

Accordingly, since the second angle component is common to the first three-dimensional point, the second three-dimensional point, and the third three-dimensional point, it may be possible to further reduce the position residual.

Furthermore, the three-dimensional data encoding method may further include generating a bitstream including the residual and first designation information indicating a three-dimensional point selected as the inter prediction point.

With this aspect, it is possible to cause the same inter prediction point to be selected on the decoding side.

Furthermore, the first three-dimensional point may be included in a first frame, and the second three-dimensional point and the third three-dimensional point may be included in a second frame different from the first frame. Here, the encoded three-dimensional points may further include a fourth three-dimensional point and a fifth three-dimensional point, the fourth three-dimensional point being included in a third frame different from the first frame and the second frame, the fifth three-dimensional point being included in the third frame and being after the fourth three-dimensional point in encoding order. Furthermore, a third angle represented by a first angle component of the fourth three-dimensional point may correspond to the first angle.

In other words, with this aspect, multiple frames are used as reference frames. Therefore, it may be possible to further reduce the distance residual.

Furthermore, the three-dimensional data encoding method may further include generating a bitstream including the residual, first designation information, and second designation information, the first designation information indicating a three-dimensional point selected as the inter prediction point, the second designation information indicating a frame in which the three-dimensional point selected is included.

With this aspect, it is possible to cause the same inter prediction point to be selected on the decoding side.

Furthermore, the three-dimensional data encoding method may further include: identifying a sixth three-dimensional point that is one place before the first three-dimensional point in encoding order; identifying a seventh three-dimensional point in a second frame different from the first frame; and identifying the third three-dimensional point in the second frame, the third three-dimensional point being two places after the seventh three-dimensional point in encoding order. Here, a fifth angle represented by a first angle component of the seventh three-dimensional point may correspond to a fourth angle represented by a first angle component of the sixth three-dimensional point.

With this aspect, first, the three-dimensional data encoding device identifies a sixth three-dimensional point that is one place before the first three-dimensional point in encoding order. Then, the three-dimensional data encoding device can identify a third three-dimensional point that is two places after a second three-dimensional point in encoding order by identifying, from the second frame, a seventh three-dimensional point that has a first angle component that corresponds to the first angle component of the sixth three-dimensional point identified, and identifying a three dimensional point that is two places after the seventh three-dimensional point in encoding order. Even when the second three-dimensional point that has a second angle that corresponds to the first angle of the first three-dimensional point is not present, with this aspect, it is possible to identify the third three-dimensional point that has an angle that is close to the first angle.

A three-dimensional data decoding method according to an aspect of the present disclosure includes: obtaining a residual between a first three-dimensional point and an inter prediction point, the first three-dimensional point being included among three-dimensional points each having a position represented by a distance component and a first angle component; selecting the inter prediction point from among decoded three-dimensional points; and decoding the first three-dimensional point by adding the residual to the inter prediction point. Here, the decoded three-dimensional points include a third three-dimensional point that is after a second three-dimensional point in decoding order, and a second angle represented by a first angle component of the second three-dimensional point corresponds to a first angle represented by a first angle component of the first three-dimensional point.

In other words, with this aspect, it may be possible to select, as the inter prediction point, a third three-dimensional point that is subsequent in decoding order to the second three-dimensional point that has an angle corresponding to the angle of the first three-dimensional point to be decoded. Accordingly, the first three-dimensional point can be appropriately decoded based on a distance residual that could possibly have been calculated to be small. However, the position residual may be the residual of the second angle component or may be both the distance residual and the residual of the second angle composition.

Furthermore, a total number of the decoded three-dimensional points may be two.

Accordingly, since it is possible to have two points as candidates of the inter prediction point, the processing amount of the process of selecting one inter prediction point from among the two encoded three-dimensional points can be reduced.

Furthermore, the third three-dimensional point may be one place after the second three-dimensional point in decoding order.

With this aspect, it is highly likely that a third three-dimensional point located at a position corresponding to an angle that is close to the angle of the first three-dimensional point will be selected as an inter prediction point. Therefore, with this aspect, the first three-dimensional point can be appropriately decoded based on a position residual that could possibly have been calculated to be small.

Furthermore, the three-dimensional points may each be represented by the distance component, the first angle component, and a second angle component. Here, the first angle component may be a horizontal angle component and the second angle component may be an elevation angle component. Furthermore, the second angle component may be common to the first three-dimensional point, the second three-dimensional point, and the third three-dimensional point.

Accordingly, since the second angle component is common to the first three-dimensional point, the second three-dimensional point, and the third three-dimensional point, the first three-dimensional point can be appropriately decoded based on a position residual that could possibly have been calculated to be even smaller.

Furthermore, the three-dimensional data decoding method may further include: obtaining the residual and first designation information indicating a three-dimensional point selected as the inter prediction point; and selecting the inter prediction point from among the decoded three-dimensional points, based on the first designation information.

With this aspect, it is possible to select the same inter prediction point as that in the encoding side.

Furthermore, the first three-dimensional point may be included in a first frame, and the second three-dimensional point and the third three-dimensional point may be included in a second frame different from the first frame. Here, the decoded three-dimensional points may further include a fourth three-dimensional point and a fifth three-dimensional point, the fourth three-dimensional point being included in a third frame different from the first frame and the second frame, the fifth three-dimensional point being included in the third frame and being after the fourth three-dimensional point in decoding order. Furthermore, a third angle represented by a first angle component of the fourth three-dimensional point may correspond to the first angle.

In other words, with this aspect, multiple frames are used as reference frames. Therefore, the first three-dimensional point can be appropriately decoded based on a position residual that could possibly have been calculated to be even smaller.

Furthermore, the three-dimensional data decoding method may further include: obtaining the residual, first designation information, and second designation information, the first designation information indicating a three-dimensional point selected as the inter prediction point, the second designation information indicating a frame in which the three-dimensional point selected is included; and selecting the inter prediction point from among the decoded three-dimensional points, based on the first designation information.

With this aspect, it is possible to select the same inter prediction point as that in the encoding side.

Furthermore, the three-dimensional data decoding method may further include: identifying a sixth three-dimensional point that is one place before the first three-dimensional point in decoding order; identifying a seventh three-dimensional point in a second frame different from the first frame; and identifying the third three-dimensional point in the second frame, the third three-dimensional point being two places after the seventh three-dimensional point in decoding order. Here, a fifth angle represented by a first angle component of the seventh three-dimensional point may correspond to a fourth angle represented by a first angle component of the sixth three-dimensional point.

For example, when the first angle component of the first three-dimensional point has not been obtained in the decoding of the first three-dimensional point, a sixth three-dimensional point that that is one place before the first three-dimensional point in decoding order is identified. This is because, since the sixth three-dimensional point is already decoded, the three-dimensional data decoding device can obtain a fourth angle represented by the first angle component of the sixth three-dimensional point. Therefore, the three-dimensional data decoding device can identify a third three-dimensional point that is two places after a second three-dimensional point in decoding order by identifying, from the second frame, a seventh three-dimensional point that has a first angle component that corresponds to the first angle component of the sixth three-dimensional point identified, and identifying a three dimensional point that is two places after the seventh three-dimensional point in decoding order.

It is to be noted that these general or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

Hereinafter, embodiments will be specifically described with reference to the drawings. It is to be noted that each of the following embodiments indicate a specific example of the present disclosure. The numerical values, shapes, materials, constituent elements, the arrangement and connection of the constituent elements, steps, the processing order of the steps, etc., indicated in the following embodiments are mere examples, and thus are not intended to limit the present disclosure. Among the constituent elements described in the following embodiments, constituent elements not recited in any one of the independent claims will be described as optional constituent elements.

EMBODIMENT

In the present embodiment, the case where one of inter prediction and intra prediction is performed on geometry information of a point cloud (point cloud) in a switching manner will be described.

FIG. 1 is a block diagram of three-dimensional data encoding device 100 according to the present embodiment. FIG. 1 illustrates processors relating to encoding geometry information (geometry) of a point cloud. However, three-dimensional data encoding device 100 may include other processors such as processors that performs encoding or the like of attribute information of the point cloud. In inter prediction and intra prediction, a point cloud to be encoded is encoded while an encoded point cloud is referred to.

Here, inter prediction is a prediction method of calculating a predicted value using a second reference three-dimensional point belonging to a second three-dimensional point cloud (second frame) different from a first three-dimensional point cloud (first frame) to which the current three-dimensional point to be encoded or decoded belongs. Inter prediction is a prediction method of calculating a predicted value using a first reference three-dimensional point belonging to a first three-dimensional point cloud (first frame) to which the current three-dimensional point to be encoded or decoded belongs.

Three-dimensional data encoding device 100 includes grouper 101, buffer 102, quantizer 103, inverse quantizer 104, buffer 105, intra predictor 106, buffer 107, motion compensator 108, inter predictor 109, switcher 110, and entropy encoder 111.

From a target point cloud which is data of an input point cloud to be encoded, grouper 101 extracts a point cloud to be a prediction tree (Predtree) which is a unit for encoding and sets the point cloud as one group. In the input target point clouds, a position of a point cloud is represented by three-dimensional polar coordinates.

Figure 2:
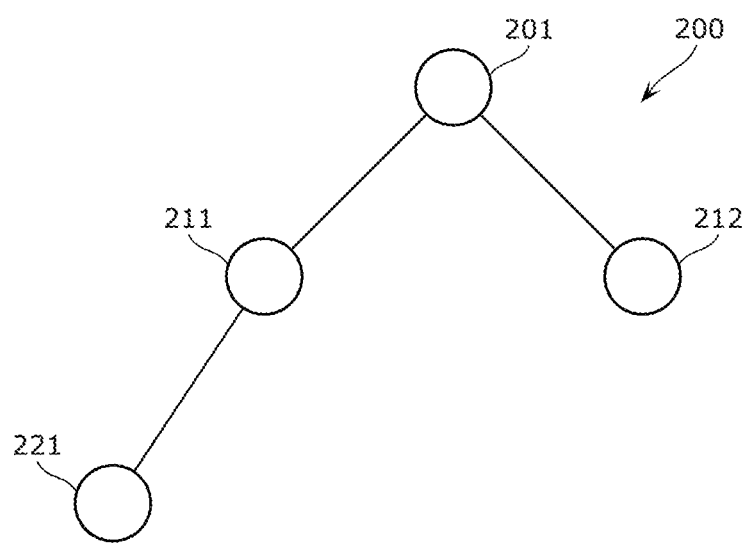
FIG. 2 is a diagram illustrating an example of a prediction tree according to the embodiment.

FIG. 2 is a diagram illustrating an example of a prediction tree according to the embodiment.

Prediction tree 200 indicates a reference relationship in prediction of positions of three-dimensional points constituting a point cloud set in one group. Prediction tree 200 includes, for example, first node 201, second node 211, and third node 212 that are child nodes of the first node, and fourth node 221 that is a child node of second node 211. First node 201, second node 211, third node 212, and fourth node 221 indicate three-dimensional points that are mutually different. First node 201 is a node higher than second node 211 and third node 212, and second node 211 is a node higher than fourth node 221. First node 201 is a node that is referred to in calculation of a predicted value of second node 211 and calculation of a predicted value of third node 212. First node 201 may be referred to in calculation of a predicted value of fourth node 221. Second node 211 is a node that is referred to in the calculation of the predicted value of fourth node 221. In this manner, one or more nodes higher than a lower node are referred to in calculation of a predicted value of the lower node. Which of the nodes is used and how the predicted values are calculated may be determined in accordance with a prediction mode. The prediction mode may include a mode that sets a fixed value as the predicted value, rather than referring to higher nodes such as the parent node and the grandparent node. For example, the fixed value may be (x,y,z)=(0,0,0) if the positions of the three-dimensional points are expressed in the Cartesian coordinate system, or may be (r,ϕ,θ)=(r_min, 0,0) if the positions of the three-dimensional points are expressed in the polar coordinate system. Here, r_min is the minimum value of the distance r (ptn_radius_min), and notification of this value may be provided in the GDU header (corresponding to a slice).

An encoding order and a decoding order of prediction tree 200 may be a depth-first order or may be a breadth-first order. Prediction tree 200 may be generated by processing three-dimensional points arranged in Morton order, one by one from a beginning three-dimensional point. For example, prediction tree 200 may be generated in such a manner that, in a process of generating prediction tree 200, a three-dimensional point the nearest to a three-dimensional point to be processed becomes a child node of the three-dimensional point to be processed.

The depth-first order is an order determined by performing arrangement of nodes from a root node as a beginning up to a leaf node such that a next node of a node is arranged as a lower node (a child node) of the node and then repeating arrangement of the remaining nodes from a highest node up to a leaf node such that a next node of a node is arranged as a lower node (a child node) of the node. In FIG. 2, the depth-first order is, for example, in the order of first node 201, second node 211, fourth node 221, and third node 212.

The breadth-first order is an order determined by performing arrangement of nodes, from a root node as a beginning, such that nodes included in each layer of a prediction tree are arranged in ascending order of depth of layer. In FIG. 2, the breadth-first order is, for example, in the order of first node 201, second node 211, third node 212, and fourth node 221.

It should be noted that polar coordinates of a point cloud to be encoded may be polar coordinates to which Cartesian coordinates of the point cloud being input are transformed or may be polar coordinates of the point cloud itself being input. For example, when a distance, a horizontal angle, and an elevation angle of a target point with respect to a sensor position are assumed to be distance d, horizontal angle Φ and elevation angle θ, respectively, these three elements may be used to represent the polar coordinates as polar coordinates (d, Φ, θ). Alternatively, elevation angle θ may be represented by information from a sensor such as laser_id of Lidar, instead. For example, the polar coordinate may be represented as (d, t, laser_id) by using laser_id having a scanning angle with a value closest to elevation angle θ instead of the elevation angle. In other words, laser_id may be used in this manner as a value indicating elevation angle θ in a polar coordinate. Using laser_id instead of elevation angle θ can reduce an amount of information, thus enabling improvement of coding efficiency.

Buffer 102 retains a generated prediction tree. For example, buffer 102 may initialize retained data for each prediction tree. Three-dimensional points included in a prediction tree (Predtree) retained in buffer 102 are subjected one by one to a process of encoding.

Then, a difference (first residual signal) between each of the three-dimensional points included in the prediction tree (Predtree) and a selected prediction point is calculated. This first residual signal will be referred to also as a prediction residual. The first residual signal is an example of a first residual.

Quantizer 103 quantizes the first residual signal. Entropy encoder 111 entropy encodes the quantized first residual signal to generate encoded data and outputs (generates) a bitstream including the encoded data.

Inverse quantizer 104 inverse quantizes the first residual signal quantized by quantizer 103. The inverse quantized first residual signal is added to a predicted value based on the selected prediction point (one or more candidate points) to be decoded as a three-dimensional point (reference point) to be used in the intra prediction and the inter prediction. The predicted value is calculated based on geometry information of one or more candidate points. Buffer 105 retains a decoded reference point cloud for the intra prediction. For example, buffer 105 may initialize retained data for each prediction tree (target point cloud). Buffer 107 retains a reference point cloud for the inter prediction. For example, buffer 107 may initialize retained data for each prediction tree (target point cloud).

Intra predictor 106 determines an intra prediction point to be used in the prediction by a predetermined method while referring to information in a prediction tree (Predtree) including a current three-dimensional point to be encoded, such as three-dimensional points included in the prediction tree (the reference point cloud for the intra prediction). For example, intra predictor 106 may determine the intra prediction point by, for example, extrapolation using two three-dimensional points (decoded points) that are inverse quantized immediately before the current three-dimensional point (e.g., an ancestor node in the prediction tree such as a parent node).

Motion compensator 108 generates an inter prediction point cloud which is a reference point cloud for the inter prediction after alignment, by reproducing the encoded point cloud based on the three-dimensional points (decoded points) included in the prediction tree (Predtree) including the current three-dimensional point, detecting a displacement between the encoded point cloud and the point cloud to be encoded (motion detection), and correcting the encoded point cloud based on the detected displacement (motion compensation).

Based on the inter prediction point cloud subjected to the motion compensation, inter predictor 109 determines an inter prediction point to be used in the prediction, by a predetermined method. For example, from the inter prediction point cloud, inter predictor 109 may select a point nearest to the intra prediction point as the inter prediction point or may select, without reference to the intra prediction point, a three-dimensional point (e.g., a three-dimensional point nearest to a three-dimensional point encoded immediately before the current three-dimensional point) in the vicinity of a three-dimensional point encoded immediately before the current three-dimensional point (or encoded last) (e.g., a three-dimensional point corresponding to an ancestor node in the prediction tree such as a parent node).

Inter predictor 109 may determine the inter prediction point using decoded horizontal angle $\Phi p$ and laser_idp of a parent node in the prediction tree (Predtree). For example, from among the inter prediction point cloud, inter predictor 109 may select a three-dimensional point that has the same laser_id as that of decoded laser_idp of the parent node and has $\Phi$ with a value close to a value of $\Phi p$+offset obtained by adding offset to decoded horizontal angle $\Phi p$ of the parent node, as the inter prediction point. Here, offset is a value equal to or greater than zero, and a value of offset may be determined in accordance with, for example, an angular velocity of horizontal scanning of lidar. Accordingly, three-dimensional data encoding device 100 can generate, from the inter prediction point cloud, a predicted value having values close to values of polar coordinates (d, $\Phi$, laser_id) of a point to be encoded. Thus, coding efficiency can be improved. The point to be encoded is an example of a first three-dimensional point. The point to be encoded may be an example of a second three-dimensional point.

Switcher 110 determines a prediction point to be used in the prediction by selecting one of the intra prediction point and the inter prediction point. In this manner, three-dimensional data encoding device 100 determines geometry information of one or more candidate points from among encoded three-dimensional points as a prediction point and calculates a predicted value based on the prediction point. Intra predictor 106 and inter predictor 109 determines a prediction point (an intra prediction point or an inter prediction point) based on a three-dimensional point encoded immediately before the current three-dimensional point. In other words, three-dimensional data encoding device 100 determines one or more candidate points for calculating the predicted value based on one or more base points from among the encoded three-dimensional points. The one or more base points are three-dimensional points to be encoded immediately before the current three-dimensional point and may be, for example, a three-dimensional point corresponding to a parent node (ancestor node) of one three-dimensional point to be encoded in the prediction tree.

It should be noted that three-dimensional data encoding device 100 may select one of the intra prediction point and the inter prediction point as the prediction point under a procedure illustrated in a flowchart in FIG. 4 described later. Information relating to the prediction (prediction information) as to whether to select one of the intra prediction point and the inter prediction point as the prediction point may be entropy encoded and written in a header part of each three-dimensional point or may be written in such a manner as to be interleaved between three-dimensional points. Information relating to the motion compensation such as motion vectors may be written in a header part of a frame or a prediction tree (Predtree), may be entropy encoded and written in a header part of each three-dimensional point, or may be written in such a manner as to be interleaved between three-dimensional points.

For example, in the case where three-dimensional data encoding device 100 performs encoding while switching a frame of an inter prediction point cloud that is referred to for each node in the prediction tree (Predtree), three-dimensional data encoding device 100 may add an identification number of a reference frame selected in the inter prediction (hereinafter, reference frame number), for each node in the prediction tree (Predtree). Accordingly, three-dimensional data encoding device 100 selects an optimal reference frame number for each node to perform the inter prediction. Thus, coding efficiency can be improved. In addition, three-dimensional data decoding device 120 (see description given later) can determine which reference frame is to be used to generate an inter prediction point by decoding the reference frame number added to each node in a bitstream. Thus, it is possible to appropriately decode a bitstream with improved coding efficiency by selecting the optimal reference frame number for each node to perform the inter prediction.

The reference point cloud for the inter prediction may be a point cloud included in an encoded frame different from a frame to be encoded or may be an encoded point cloud included in the same frame as the frame to be encoded.

In this manner, three-dimensional data encoding device 100 predicts a point to be encoded using the inter prediction in addition to the intra prediction. Thereby, it may be possible to reduce an amount of information of a first residual signal to be entropy encoded, thus enabling improvement of coding efficiency.

It should be noted that three-dimensional data encoding device 100 need not always refer to an inter prediction point. Three-dimensional data encoding device 100 may perform the encoding based only on information of a point cloud to be encoded by, for example, initializing buffer 107 storing a reference point cloud for the inter prediction at predetermined time intervals (e.g., every 1 second, etc.), at predetermined frame intervals (e.g., every 30 frames, etc.), or at any timing for notifying a three-dimensional data decoding device. Accordingly, it becomes possible for the corresponding three-dimensional data decoding device to start a jump playback from a point cloud that is not a beginning of a bitstream and for which an inter prediction point is not referred to. Thus, it may be possible to improve random accessibility or error tolerance of the bitstream.

In the case where three-dimensional data encoding device 100 has coordinates of an input point cloud to be encoded represented by Cartesian coordinates as geometry information, three-dimensional data encoding device 100 encodes the geometry information indicated by the coordinates represented by Cartesian coordinates.

In the case where three-dimensional data encoding device 100 has coordinates of an input point cloud to be encoded represented by polar coordinates as geometry information, three-dimensional data encoding device 100 encodes the geometry information indicated by the coordinates represented by polar coordinates.

Figure 3:
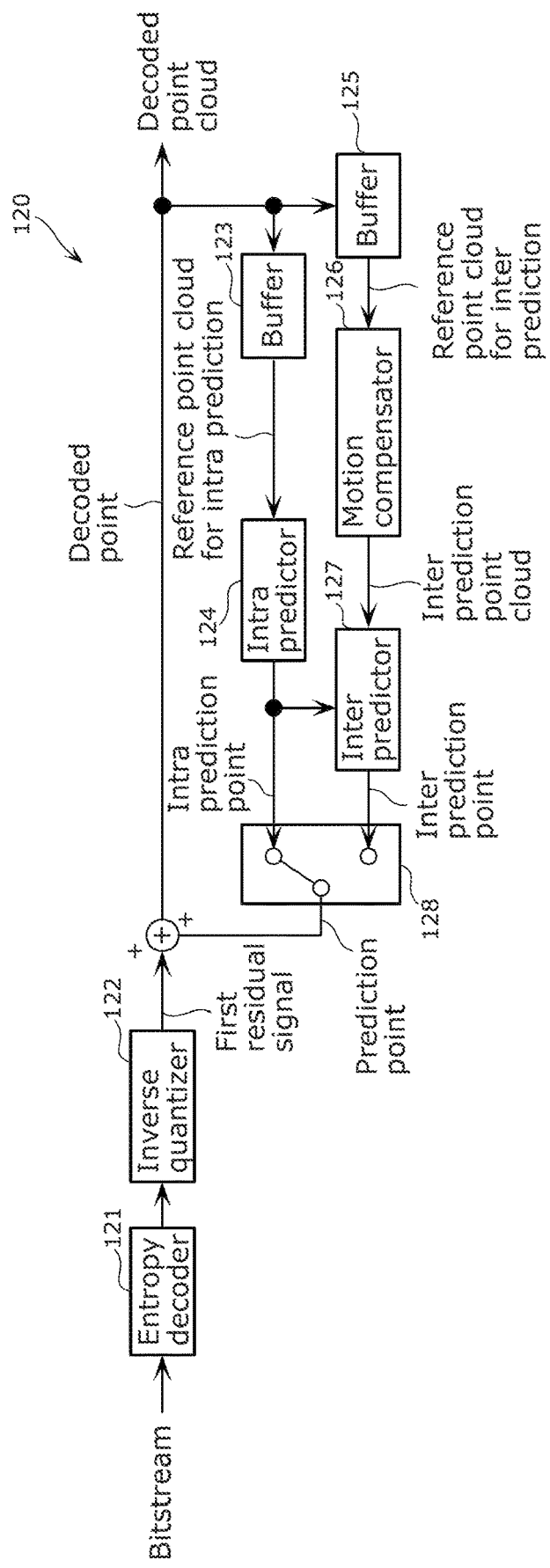
FIG. 3 is a block diagram of a three-dimensional data decoding device according to the embodiment.

FIG. 3 is a block diagram of three-dimensional data decoding device 120 according to the present embodiment. FIG. 3 illustrates processors relating to decoding geometry information (geometry) of a point cloud. However, three-dimensional data decoding device 120 may include another processor such as a processor that performs decoding or the like of attribute information of the point cloud. Three-dimensional data decoding device 120 performs inter prediction decoding, in which a point cloud to be decoded is decoded while a decoded point cloud is referred to. For example, three-dimensional data decoding device 120 decodes a bitstream generated by three-dimensional data encoding device 100 illustrated in FIG. 1.

Three-dimensional data decoding device 120 includes entropy decoder 121, inverse quantizer 122, buffer 123, intra predictor 124, buffer 125, motion compensator 126, inter predictor 127, and switcher 128.

Three-dimensional data decoding device 120 obtains a bitstream generated by three-dimensional data encoding device 100.

Entropy decoder 121 entropy decodes an input bitstream for each three-dimensional point in a prediction tree (Predtree) to generate an quantized first residual signal. Inverse quantizer 122 inverse quantizes the quantized first residual signal to reproduce the first residual signal. The first residual signal of each three-dimensional point is added to a predicted value based on a prediction point corresponding to the three-dimensional point and then generated (output) as a decoded point. In other words, three-dimensional data decoding device 120 adds the predicted value and the prediction residual together to calculate geometry information of one three-dimensional point to be decoded.

Buffer 123 retains the generated decoded points as a reference point cloud for the intra prediction. For example, buffer 123 may initialize data retained for each prediction tree (target point cloud). Buffer 125 retains the generated decoded points as a reference point cloud for the inter prediction. For example, buffer 125 may initialize data retained for each prediction tree (target point cloud).

Intra predictor 124 determines an intra prediction point to be used in the prediction by a predetermined method while referring to information in a prediction tree (Predtree) including a three-dimensional point to be decoded, such as three-dimensional points included in the prediction tree (the reference point cloud for the intra prediction). For example, intra predictor 124 may determine the intra prediction point by, for example, extrapolation using two three-dimensional points (decoded points) that are inverse quantized immediately before the three-dimensional point to be decoded (e.g., an ancestor node in the prediction tree such as a parent node).

Motion compensator 126 generates an inter prediction point cloud that is a reference point cloud for the inter prediction after alignment, by reproducing the decoded point cloud based on the three-dimensional points (decoded points) included in the prediction tree (Predtree) including the three-dimensional point to be decoded, and correcting a displacement between the decoded point cloud and the point cloud to be decoded (motion compensation).

Based on the inter prediction point cloud subjected to the motion compensation, inter predictor 127 determines an inter prediction point to be used in the prediction, by a predetermined method. For example, from the inter prediction point cloud, inter predictor 127 may select a point nearest to the intra prediction point as the inter prediction point or may select, without reference to the intra prediction point, a three-dimensional point (e.g., a three-dimensional point nearest to a three-dimensional point decoded immediately before the current three-dimensional point) in the vicinity of a three-dimensional point decoded immediately before the current three-dimensional point (e.g., a three-dimensional point corresponding to an ancestor node in the prediction tree such as a parent node), as the inter prediction point.

Inter predictor 127 may determine the inter prediction point using decoded horizontal angle $\Phi p$ and laser_idp of a parent node in the prediction tree (Predtree). For example, from among the inter prediction point cloud, inter predictor 127 may select a three-dimensional point that has the same laser_id as that of decoded laser_idp of the parent node and has $\Phi$ with a value close to a value of $\Phi p+\text{offset}$ obtained by adding offset to decoded horizontal angle $\Phi p$ of the parent node, as the inter prediction point. Here, offset is a value equal to or greater than zero, and a value of offset may be determined in accordance with, for example, an angular velocity of horizontal scanning of lidar. It should be noted that notification of the offset may be, for example, provided in a header such as the GPS by three-dimensional data encoding device 100 to three-dimensional data decoding device 120. Accordingly, three-dimensional data decoding device 120 can appropriately decode a bitstream with improved coding efficiency by generating a predicted value having values close to values of polar coordinates (d, $\Phi$, laser_id) of a point to be decoded from the inter prediction point cloud. The point to be decoded is an example of a first three-dimensional point. The point to be decoded may be an example of a second three-dimensional point.

Switcher 128 determines a prediction point to be used in the prediction by selecting one of the intra prediction point and the inter prediction point. In this manner, three-dimensional data decoding device 120 determines geometry information of one or more candidate points from among decoded three-dimensional points as a prediction point and calculates a predicted value based on the prediction point. Intra predictor 124 and inter predictor 127 determine a prediction point (an intra prediction point or an inter prediction point) based on a three-dimensional point decoded immediately before the three-dimensional point to be decoded. In other words, three-dimensional data decoding device 120 determines one or more candidate points for calculating the predicted value based on one or more base points from among the decoded three-dimensional points. The one or more base points are three-dimensional points to be encoded immediately before the three-dimensional point to be decoded and may be, for example, a three-dimensional point corresponding to a parent node (ancestor node) of one three-dimensional point to be decoded in the prediction tree.

It should be noted that three-dimensional data decoding device 120 may select one of the intra prediction point and the inter prediction point as the prediction point under a process illustrated in a flowchart in FIG. 5 described later. Three-dimensional data decoding device 120 may select one of the intra prediction point and the inter prediction point as the prediction point based on information relating to the prediction (prediction information) as to whether to select one of the intra prediction point and the inter prediction point as the prediction point. The prediction information may be entropy encoded and written in a header part of each three-dimensional point or may be written in such a manner as to be interleaved between three-dimensional points. Information relating to the motion compensation such as motion vectors may be written in a header part of a frame or a prediction tree (Predtree), may be entropy encoded and written in a header part of each point, or may be written in such a manner as to be interleaved between three-dimensional points. In this manner, three-dimensional data decoding device 120 may be notified of the prediction information or the information relating to the motion compensation by corresponding three-dimensional data encoding device 100. The reference point cloud for the inter prediction may be a point cloud included in an encoded frame different from a frame to be encoded or may be an encoded point cloud included in the same frame as the frame to be encoded. The reference point cloud for the inter prediction may be a point cloud included in an encoded frame different from a frame to be encoded or may be an encoded point cloud included in the same frame as the frame to be encoded.

In this manner, three-dimensional data decoding device 120 predicts a point to be decoded using the inter prediction in addition to the intra prediction, thereby being capable of decoding a point cloud from a bitstream that is encoded while a decoded point cloud is referred to (e.g., the bitstream output from three-dimensional data encoding device 100 in FIG. 1).

It should be noted that three-dimensional data decoding device 120 need not always refer to an inter prediction point. Three-dimensional data decoding device 120 may perform the decoding based only on information of a point cloud to be decoded by, for example, initializing buffer 125 storing a reference point cloud for the inter prediction at predetermined time intervals (e.g., every 1 second, etc.), at predetermined frame intervals (e.g., every 30 frames, etc.), or at any timing for being notified by corresponding three-dimensional data encoding device 100. Accordingly, three-dimensional data decoding device 120 is enabled to start a jump playback from a point cloud that is not a beginning of a bitstream and for which an inter prediction point is not referred to, so that there is a possibility that random accessibility or error tolerance of the bitstream can be improved.

In a case where a bitstream has encoded data into which geometry information indicated by coordinates represented by Cartesian coordinates is encoded, three-dimensional data decoding device 120 decodes the geometry information indicated by the coordinates represented by Cartesian coordinates. In a case where a bitstream has encoded data into which geometry information indicated by coordinates represented by polar coordinates is encoded, three-dimensional data decoding device 120 decodes the geometry information indicated by the coordinates represented by polar coordinates.

Figure 4:
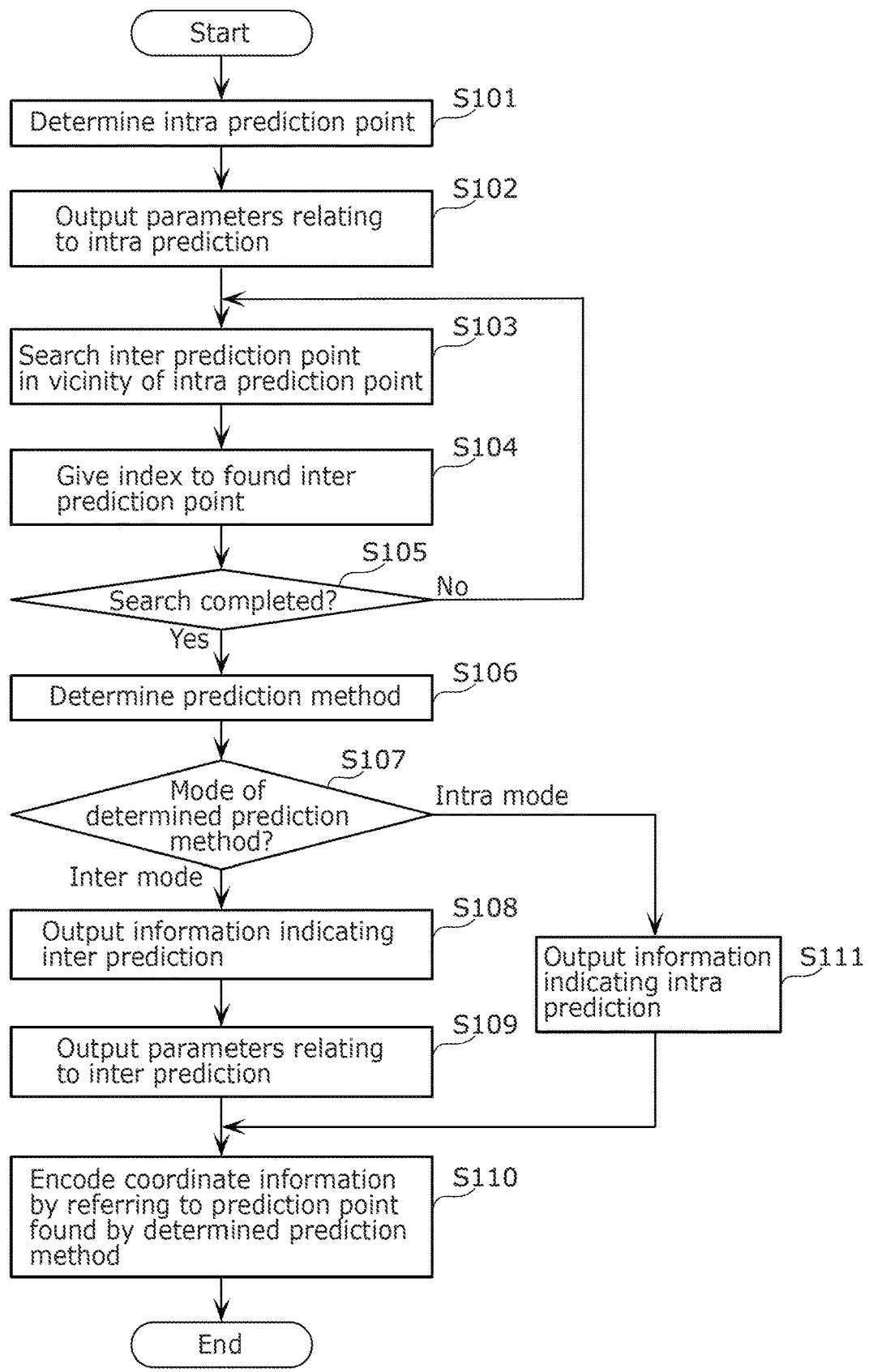
FIG. 4 is a flowchart illustrating an example of a procedure of encoding each three-dimensional point in a prediction tree (Predtree) by the three-dimensional data encoding device.

FIG. 4 is a flowchart illustrating an example of a procedure of encoding each three-dimensional point in a prediction tree (Predtree) by three-dimensional data encoding device 100.

In this example, three-dimensional data encoding device 100 first determines an intra prediction point from a reference point cloud for intra prediction (S101). Three-dimensional data encoding device 100 may determine the intra prediction point using, for example, a method for determining a prediction point using a prediction tree disclosed in the embodiment already described. For example, three-dimensional data encoding device 100 may generate a prediction tree using encoded three-dimensional points and select one or more candidate points from the encoded three-dimensional points based on the prediction tree. Three-dimensional data encoding device 100 may determine, as the intra prediction point, a prediction point that gives the smallest code amount from among at least one intra prediction point that is determined by at least one of the methods described above. Three-dimensional data encoding device 100 may determine, as the intra prediction point, a prediction point that gives the smallest sum of absolute values (or sum of squares) of coordinate residuals from among at least one intra prediction point that is determined by at least one of the methods described above.

Next, three-dimensional data encoding device 100 outputs parameters relating to intra prediction (S102). In a case where the number of candidates for the methods for determining an intra prediction point determined in step S101 is two or more, three-dimensional data encoding device 100 may output, to a bitstream, information of a selected candidate for the determining method as the parameters relating to intra prediction.

Next, three-dimensional data encoding device 100 determines an inter prediction point by referring to at least one candidate point that is extracted from an inter prediction point cloud. For example, three-dimensional data encoding device 100 may determine one candidate point as the inter prediction point or may determine, as the inter prediction point, a prediction point having coordinates that are average values of sets of coordinates of candidate points.

Alternatively, three-dimensional data encoding device 100 may determine, as the inter prediction point, a prediction point having coordinates that are average values of sets of coordinates of the intra prediction point and at least one candidate point.

Here, as the at least one candidate point, three-dimensional data encoding device 100 may search for a point that is positioned in the vicinity of the intra prediction point (S103).

Next, three-dimensional data encoding device 100 may give index values to at least one determined inter prediction point in such a manner that a smaller index value is given to an inter prediction point nearer to the intra prediction point (S104).

Next, three-dimensional data encoding device 100 determines whether the search has completed (S105). In a case where the search has completed (Yes in S105), the procedure proceeds to next step S106, and in a case where the search has not completed (No in S105), the procedure returns to step S103. The completion may be determined by finding a predetermined number of inter prediction points, may be determined by completion of a search of the entire point cloud within a predetermined range, or may be determined by satisfaction of one of finding the predetermined number of inter prediction points and the completion of a search of the entire point cloud within the predetermined range.

Next, three-dimensional data encoding device 100 determines a prediction method (S106). Specifically, three-dimensional data encoding device 100 determines the intra prediction or the inter prediction as a method for determining a prediction point. In other words, three-dimensional data encoding device 100 determines which of the intra prediction point and the inter prediction point is determined as the prediction point. For example, three-dimensional data encoding device 100 may determine, as the prediction method, a method for predicting a prediction point that gives a smaller code amount from between the intra prediction point and the inter prediction point. Three-dimensional data encoding device 100 may determine, as the prediction method, a method for predicting a prediction point that gives a smaller sum of absolute values (or sum of squares) of coordinate residuals from between the intra prediction point and the inter prediction point.

Three-dimensional data encoding device 100 determines whether a mode of the determined prediction method is an inter mode indicating that the prediction method is the inter prediction or an intra prediction mode indicating that the prediction method is the intra prediction (S107).

In a case where the determined prediction method is the inter prediction (inter mode in S107), three-dimensional data encoding device 100 outputs identification information indicating that an inter prediction point is determined as a prediction point (e.g., flag) to the bitstream (S108).

Next, three-dimensional data encoding device 100 outputs, to the bitstream, information of the number of candidate points to be used for determining coordinates of the inter prediction point, index values of the candidate points to be used, and the like, as parameters relating to inter prediction (S109). The index values may be assigned to one or more candidate points to be used for determining the predicted value.

In a case where the determined method for the prediction is the intra prediction (intra mode in S107), three-dimensional data encoding device 100 outputs identification information indicating that an intra prediction point is determined as the prediction point (e.g., flag) to the bitstream (S111). The items of identification information in step S108 and step S111 are items of information indicating which of the inter prediction point and the intra prediction point is determined as the prediction point.

After step S109 or step S111, three-dimensional data encoding device 100 encodes coordinate information of a current three-dimensional point to be encoded by referring to the prediction point found by the determined prediction method (S110).

In this manner, three-dimensional data encoding device 100 determines at least one inter prediction point by referring to the inter prediction point cloud and the intra prediction point, determines the method for finding the prediction point from the intra prediction point and the inter prediction point, and encodes geometry information (coordinate information) of the current three-dimensional point by referring to the prediction point.

Three-dimensional data encoding device 100 may be configured, in step S103, to search for the inter prediction point, without referring to the intra prediction point, in the vicinity of a three-dimensional point that is uniquely determined independently of the parameters relating to intra prediction, such as a three-dimensional point encoded immediately before the current three-dimensional point (e.g., a three-dimensional point corresponding to an ancestor node in the prediction tree such as a parent node). In this case, three-dimensional data encoding device 100 may be configured not to perform step S102 immediately after step S101 but to perform step S102 immediately after step S111.

Figure 5:
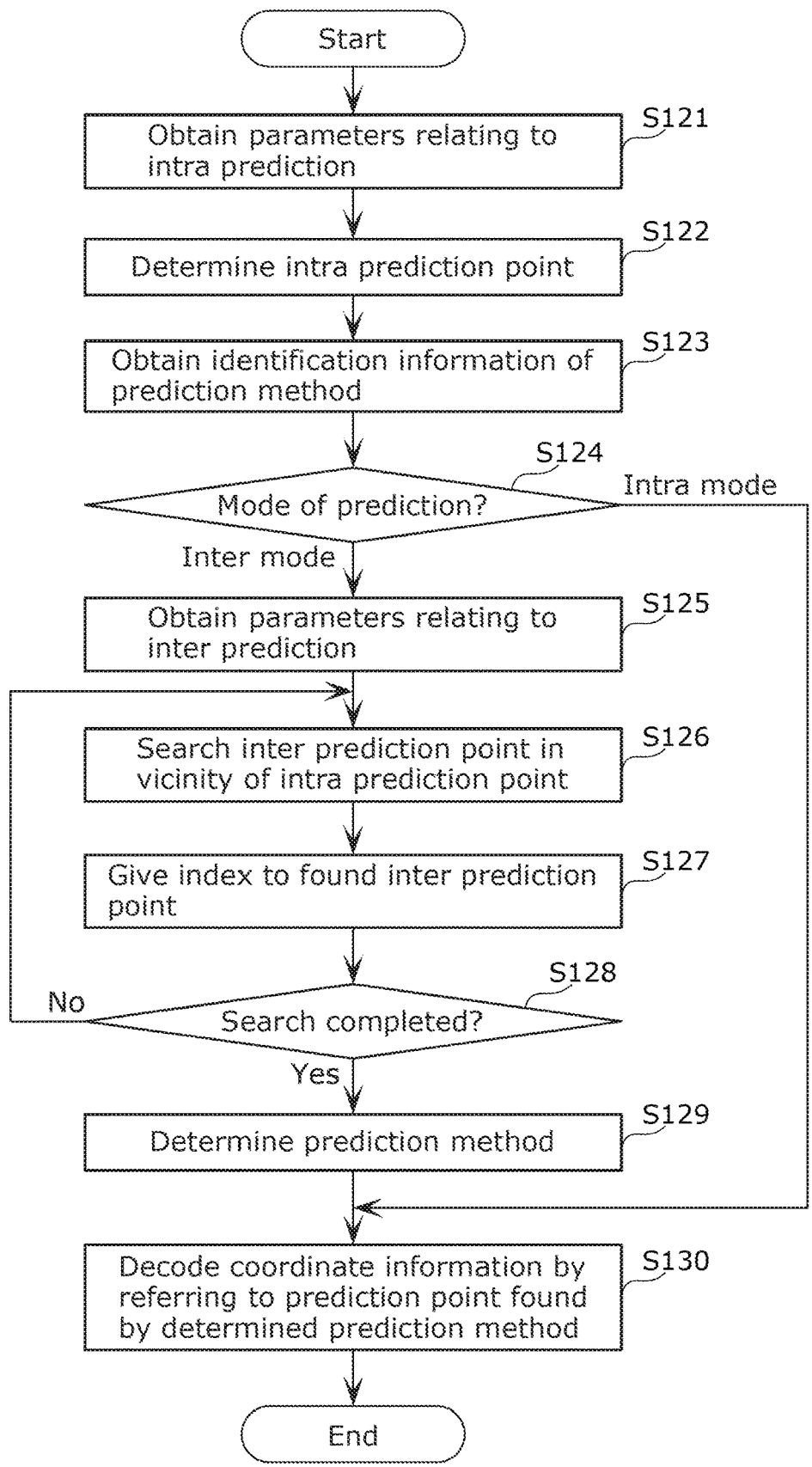
FIG. 5 is a flowchart illustrating an example of a procedure of decoding each three-dimensional point in a prediction tree (Predtree) by the three-dimensional data decoding device.

FIG. 5 is a flowchart illustrating an example of a procedure of decoding each three-dimensional point in a prediction tree (Predtree) by three-dimensional data decoding device 120. FIG. 5 provides decoding of a bitstream that is generated under the procedure of encoding in FIG. 4. In other words, the bitstream includes encoded first residual signals (prediction residuals) and index values that are assigned to candidate points to be used for calculating a predicted value.

In this example, three-dimensional data decoding device 120 first obtains the parameters relating to intra prediction from the bitstream (S121).

Next, based on the parameters relating to intra prediction, three-dimensional data decoding device 120 determines an intra prediction point (S122). Specifically, three-dimensional data decoding device 120 determines the intra prediction point by the same method as step S101 in FIG. 4. Three-dimensional data decoding device 120 is notified of the parameters relating to intra prediction by corresponding three-dimensional data encoding device 100 and determines the intra prediction point based on the parameters relating to intra prediction. The parameters relating to intra prediction are obtained in step S121 and include information for specifying at least one method for determining the intra prediction point and a parameter accompanying the information.

Next, three-dimensional data decoding device 120 obtains identification information indicating a mode of the prediction method from the bitstream (S123).

Next, three-dimensional data decoding device 120 determines whether the obtained identification information indicates the inter mode indicating that the prediction method is the inter prediction or the intra prediction mode indicating that the prediction method is the intra prediction (S124).

In a case where the prediction method is the inter prediction (inter mode in S124), three-dimensional data decoding device 120 obtains parameters relating to inter prediction from the bitstream (S125).

Next, three-dimensional data decoding device 120 performs processes for determining an inter prediction point (S126 to S129). Specifically, three-dimensional data decoding device 120 determines the inter prediction point by the same method as steps S103 to S105 in FIG. 4. For example, three-dimensional data decoding device 120 determines the inter prediction point by referring to at least one candidate point that is extracted from an inter prediction point cloud. For example, three-dimensional data decoding device 120 may determine one candidate point as the inter prediction point or may determine, as the inter prediction point, a prediction point having coordinates that are average values of sets of coordinates of candidate points. Alternatively, three-dimensional data decoding device 120 may determine, as the inter prediction point, a prediction point having coordinates that are average values of sets of coordinates of the intra prediction point and at least one candidate point.

Here, as the at least one candidate point, three-dimensional data decoding device 120 may search for a point that is positioned in the vicinity of the intra prediction point (S126).

Next, three-dimensional data decoding device 120 may give index values to at least one determined inter prediction point in such a manner that a smaller index value is given to an inter prediction point nearer to the intra prediction point (S127).

Next, three-dimensional data decoding device 120 determines whether the search has completed (S128). In a case where the search has completed (Yes in S128), the procedure proceeds to next step S129, and in a case where the search has not completed (No in S128), the procedure returns to step S126. The completion may be determined by finding a predetermined number of inter prediction points, may be determined by completion of a search of the entire point cloud within a predetermined range, or may be determined by satisfaction of one of finding the predetermined number of inter prediction points and the completion of a search of the entire point cloud within the predetermined range.

Next, three-dimensional data decoding device 120 determines the inter prediction point based on the parameters relating to inter prediction while referring to the inter prediction point cloud and the intra prediction point (S129). For example, three-dimensional data decoding device 120 determines the inter prediction point by identifying candidate points to be used for determining coordinates of the inter prediction point based on the information of the number of candidate points to be used for determining coordinates of the inter prediction point and the index values assigned to the candidate points to be used that are included in the parameters relating to inter prediction and by determining coordinates of the inter prediction point using the identified candidate points. In other words, three-dimensional data decoding device 120 selects one candidate point from decoded three-dimensional points based on the index values included in the bitstream.

After step S129 or in a case of the intra mode in step S124, three-dimensional data decoding device 120 decodes geometry information (coordinate information) of a current three-dimensional point to be decoded by referring to the prediction point found by the specified prediction method (S130).

In this manner, in the case where the prediction method is the inter prediction, three-dimensional data decoding device 120 decodes the coordinate information of the point to be decoded by referring to the inter prediction point, and in the case where the prediction method is the intra prediction, three-dimensional data decoding device 120 decodes the coordinate information of the point to be decoded by referring to the intra prediction point.

Three-dimensional data decoding device 120 may be configured, in step S126, to search for the inter prediction point, without referring to the intra prediction point, in the vicinity of a three-dimensional point that is uniquely determined independently of the parameters relating to intra prediction, such as a three-dimensional point decoded immediately before the current three-dimensional point (e.g., a three-dimensional point corresponding to an ancestor node in the prediction tree such as a parent node). In this case, three-dimensional data decoding device 120 may be configured to perform step S121 and step S122 not immediately before step S123 but in the case where the intra mode is determined in step S124.

Figure 6:
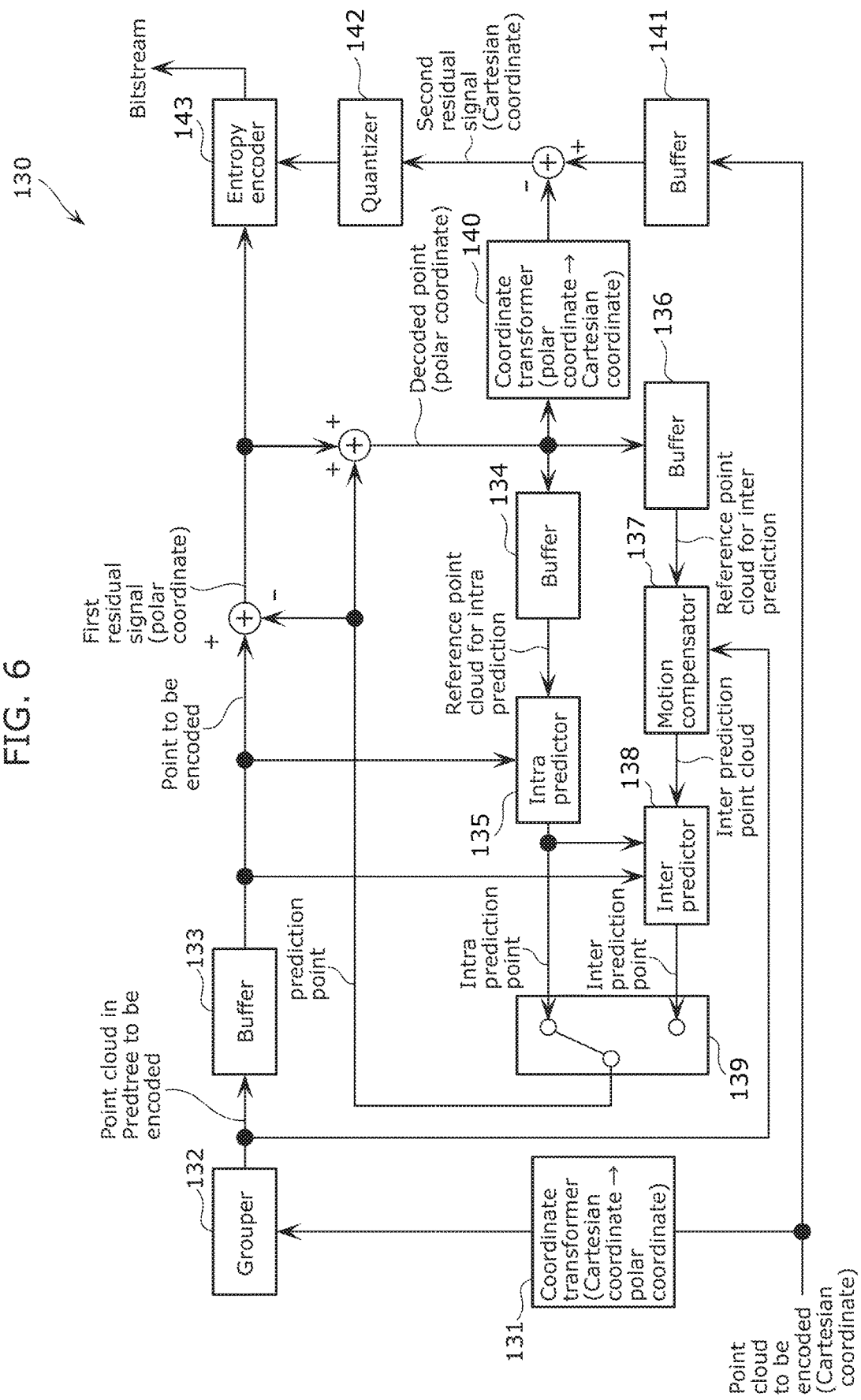
FIG. 6 is a block diagram of a three-dimensional data encoding device according to a variation of the embodiment.

FIG. 6 is a block diagram of three-dimensional data encoding device 130 according to a variation of the present embodiment. FIG. 6 illustrates processors relating to encoding geometry information (geometry) of a point cloud. However, three-dimensional data encoding device 130 may include other processors such as processors that performs encoding or the like of attribute information of the point cloud. In inter prediction and intra prediction, a point cloud to be encoded is encoded while an encoded point cloud is referred to. Compared with three-dimensional data encoding device 100 in FIG. 1, three-dimensional data encoding device 130 differs in its configuration and operation in that coordinate transformer 131 for transforming a point cloud having items of geometry information represented by Cartesian coordinates to items of geometry information represented by polar coordinates and encoding the items of geometry information represented by polar coordinates is included, in that a prediction residual of geometry information represented by polar coordinates (a first residual signal) is not quantized, and in that a second residual signal in Cartesian coordinates, which is equivalent to an error that occurs in transformation between Cartesian coordinates and polar coordinates. At the same time, compared with three-dimensional data encoding device 100, three-dimensional data encoding device 130 is the same in its configuration and operation in regards other than the regards described above.

Three-dimensional data encoding device 130 includes coordinate transformer 131, grouper 132, buffer 133, buffer 134, intra predictor 135, buffer 136, motion compensator 137, inter predictor 138, switcher 139, coordinate transformer 140, buffer 141, quantizer 142, and entropy encoder 143.

Coordinate transformer 131 transforms a coordinate system of geometry information of a target point cloud which is data of an input point cloud to be encoded from a Cartesian coordinate system to a polar coordinate system. In other words, coordinate transformer 131 transforms a coordinate system of Cartesian-coordinate geometry information of one three-dimensional point to be encoded to generate polar-coordinate geometry information. The point cloud to be encoded that is transformed in polar coordinates is output to grouper 132.

From the target point cloud being the point cloud to be encoded that is transformed in polar coordinates grouper 132 extracts a point cloud to be a prediction tree (Predtree) which is a unit for encoding, and sets the point cloud as one group. Buffer 133 retains a generated prediction tree. For example, buffer 133 may initialize retained data for each prediction tree. Three-dimensional points included in a prediction tree (Predtree) retained in buffer 133 are subjected one by one to a process of encoding.

A difference between each of three-dimensional points included in the prediction tree retained in buffer 133 (each point to be encoded) and a prediction point selected for the point to be encoded (first residual signal) is calculated. The first residual signal is a residual signal of geometry information represented in polar coordinates. The first residual signal will be referred to also as a prediction residual. The first residual signal is an example of a first residual. Since items of geometry information of the three-dimensional points retained in buffer 133 are transformed into the polar coordinate system, the first residual is a difference between a transformed polar-coordinate geometry information and a predicted value.

Then, the first residual signal and the prediction point are added together and retained in buffers 134 and 136 as a decoded point subjected to the encoding process. Geometry information of the decoded point retained in buffers 134 and 136 is represented by polar coordinates. In this regard, buffers 134 and 136 differ in function from buffers 105 and 107 but are the same in function as buffers 105 and 107 in other respects, respectively.

Likewise, intra predictor 135, motion detector/compensator 137, inter predictor 138, and switcher 139 differ in function from intra predictor 106, motion compensator 108, inter predictor 109, and switcher 110 in that geometry information of a three-dimensional point to be processed is represented by polar coordinates but are the same in function as intra predictor 106, motion compensator 108, inter predictor 109, and switcher 110 in other respects, respectively.

Coordinate transformer 140 obtains the same decoded point as the decoded point retained in buffers 134 and 136 and transforms a coordinate system of geometry information of the obtained decoded point from the polar coordinate system to the Cartesian coordinate system. In other words, coordinate transformer 140 inversely transforms the coordinate system of the polar-coordinate geometry information transformed by coordinate transformer 131 to generate Cartesian-coordinate geometry information.

Buffer 141 retains the geometry information of the three-dimensional point that is input into three-dimensional data encoding device 130 and represented by Cartesian coordinates.

Then, a difference (second residual signal) between the input Cartesian-coordinate geometry information and the Cartesian-coordinate geometry information of which the coordinate system is transformed from the polar coordinate system to the Cartesian coordinate system by coordinate transformer 140 is calculated. The second residual signal is an example of a second residual. In other words, the second residual signal is a difference between the Cartesian-coordinate geometry information that is not subjected to coordinate transformation by coordinate transformer 131 and the geometry information that is once transformed to polar coordinates and further inversely transformed to the Cartesian coordinate system. The second residual signal is a transformation error occurring in the coordinate transformation.

Quantizer 142 quantizes the second residual signal.

Entropy encoder 143 entropy encodes the first residual signal and the quantized second residual signal to generate items of encoded data and outputs a bitstream including the items of encoded data.

In this manner, three-dimensional data encoding device 130 transforms a coordinate system of geometry information of a three-dimensional point from the Cartesian coordinate system to the polar coordinate system and encodes polar-coordinate geometry information. Accordingly, in a case where a point cloud generated by obtaining a three-dimensional position of a neighbor object with respect to a sensor position, as in LiDAR, is encoded, the precision of predicting a point to be encoded can be improved, so that there is a possibility that coding efficiency can be improved.

Figure 7:
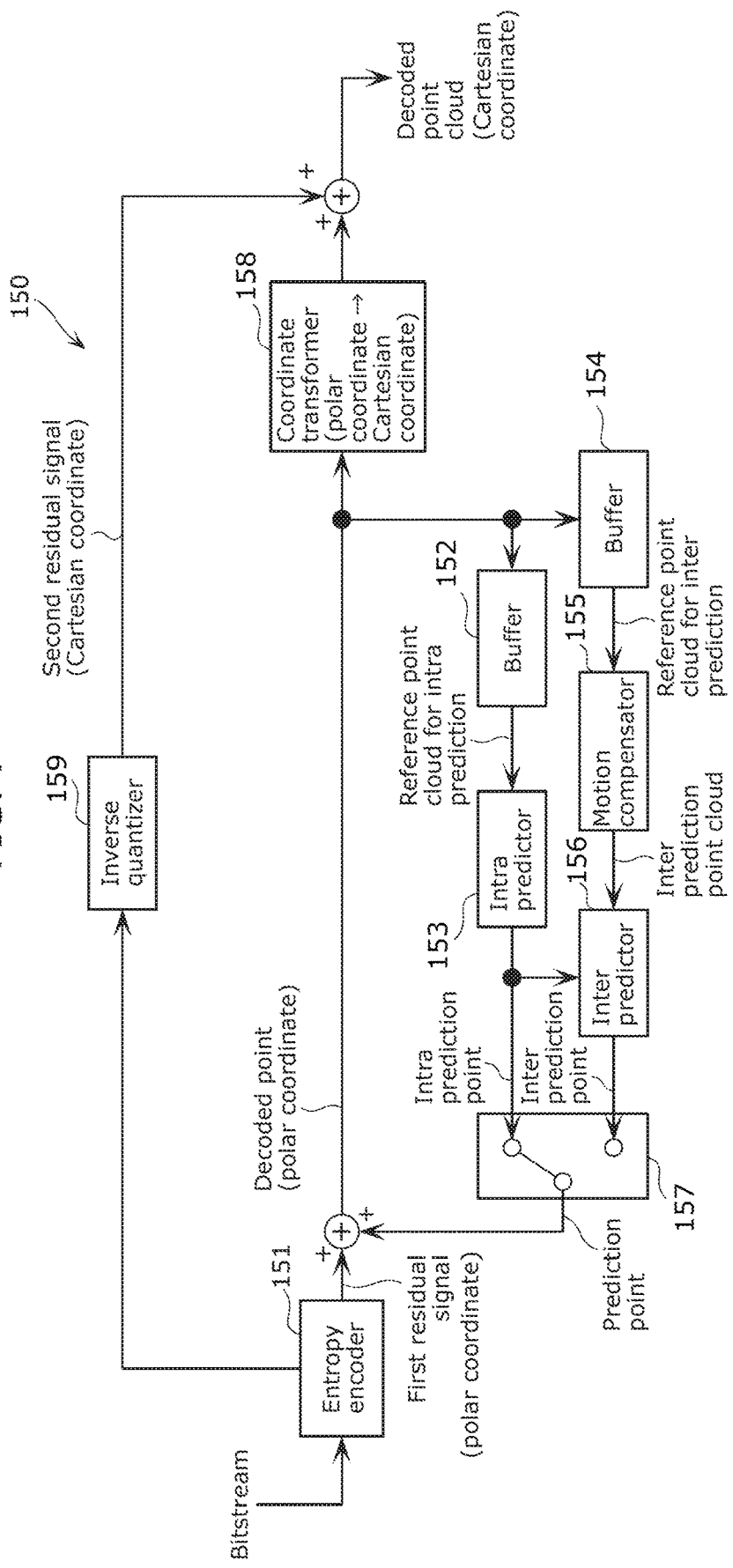
FIG. 7 is a block diagram of a three-dimensional data decoding device according to the variation of the embodiment.

FIG. 7 is a block diagram of three-dimensional data decoding device 150 according to the variation of the present embodiment. FIG. 7 illustrates processors relating to decoding geometry information (geometry) of a point cloud. However, three-dimensional data decoding device 150 may include other processors such as processors that perform decoding or the like of attribute information of the point cloud. Three-dimensional data decoding device 150 performs inter prediction decoding, in which a point cloud to be decoded is decoded while a decoded point cloud is referred to. For example, three-dimensional data decoding device 150 decodes a bitstream generated by three-dimensional data encoding device 130 illustrated in FIG. 6. Compared with three-dimensional data decoding device 120 in FIG. 3, three-dimensional data decoding device 150 differs in its configuration and operation in that the inverse quantization of the first residual signal (prediction residual) is not performed and in that a second residual signal in Cartesian coordinates, which is equivalent to a transformation error occurring in transformation between Cartesian coordinates and polar coordinates is entropy decoded, inversely quantized, reproduced, added to a point that is transformed from a corresponding decoded point in polar coordinates into Cartesian coordinates, and output as a decoded point in Cartesian coordinates. At the same time, compared with three-dimensional data decoding device 120, three-dimensional data decoding device 150 is the same in regards other than the regards described above.

Three-dimensional data decoding device 150 includes entropy decoder 151, buffer 152, intra predictor 153, buffer 154, motion compensator 155, inter predictor 156, switcher 157, coordinate transformer 158, and inverse quantizer 159.

Entropy decoder 151 entropy decodes the input bitstream for each three-dimensional point in a prediction tree (Predtree) to generate a first residual signal and a quantized second residual signal. The first residual signal for each three-dimensional point is added to a predicted value based on a prediction point corresponding to the three-dimensional point and then generated (output) as a decoded point represented by polar coordinates.

Buffer 152 retains the generated decoded points as a reference point cloud for intra prediction. For example, buffer 152 may initialize retained data for each prediction tree (target point cloud). Buffer 154 retains the generated decoded points as a reference point cloud for inter prediction. For example, buffer 154 may initialize retained data for each prediction tree (target point cloud). Geometry information of the decoded point retained in buffers 152 and 154 is represented by polar coordinates. In this regard, buffers 152 and 154 differ in function from buffers 123 and 125 but are the same in function as buffers 123 and 125 in other respects, respectively.

Likewise, intra predictor 153, motion compensator 155, inter predictor 156, and switcher 157 differ in function from intra predictor 124, motion compensator 126, inter predictor 127, and switcher 128 in that geometry information of a three-dimensional point to be processed is represented by polar coordinates but are the same in function as intra predictor 124, motion compensator 126, inter predictor 127, and switcher 128 in other respects, respectively.

Coordinate transformer 158 obtains the same decoded point as the decoded point retained in buffers 152 and 154 and transforms a coordinate system of geometry information of the obtained decoded point from the polar coordinate system to the Cartesian coordinate system.

Inverse quantizer 159 inverse quantizes the quantized second residual signal to reproduce the second residual signal.

The Cartesian-coordinate geometry information obtained by the coordinate transformation by coordinate transformer 158 and the second residual signal reproduced by the inverse quantization by inverse quantizer 159 are added together and generate (output) as a decoded point including the Cartesian-coordinate geometry information.

In this manner, three-dimensional data decoding device 150 includes means for transforming a coordinate system of a decoded point having polar-coordinate geometry information from the polar coordinate system to the Cartesian coordinate system and adding the decoded point to the second residual signal in Cartesian coordinates that is equivalent to an error occurring in transformation between Cartesian-coordinate geometry information and polar-coordinate geometry information. Accordingly, three-dimensional data decoding device 150 is capable of decoding a point cloud from an encoded bitstream (e.g., a bitstream output from three-dimensional data encoding device 130 in FIG. 6) while referring to an encoded point cloud in polar coordinates.

Figure 8:
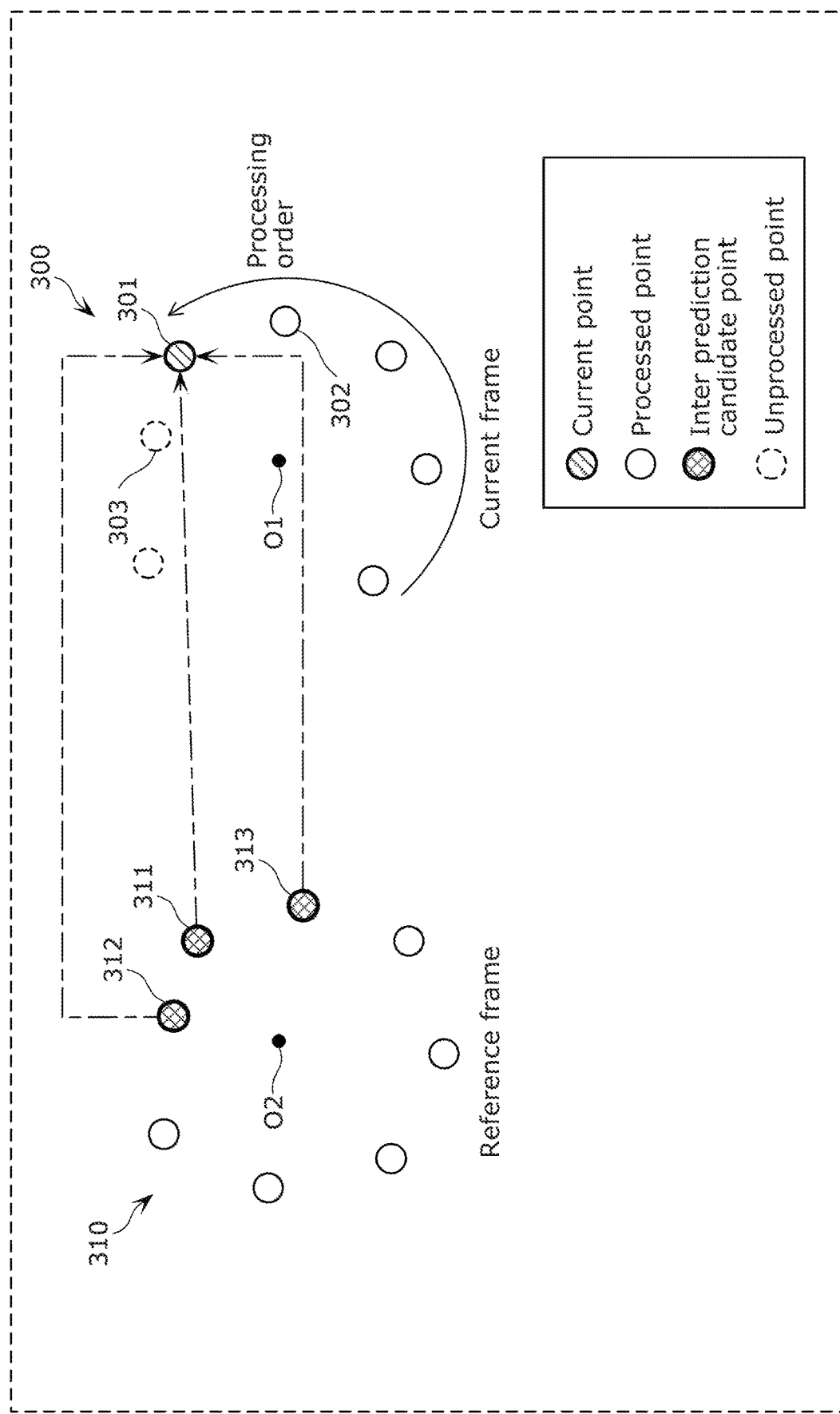
FIG. 8 is a diagram for describing an example of an inter prediction method according to the embodiment.

FIG. 8 is a diagram for describing an example of an inter prediction method according to the embodiment.

The inter prediction method is performed by three-dimensional data encoding devices 100 and 130 and three-dimensional data decoding devices 120 and 150.

FIG. 8 illustrates a view with mutually orthogonal X, Y, and Z axes in which three-dimensional points are projected on the XY plane viewed from the Z-axis direction. Current frame 300 in FIG. 8 includes three-dimensional points for which an arbitrary first position is set as origin O1. Each of the three-dimensional points in current frame 300 has a distance component, a first angle component (a horizontal angle), and a second angle component (an elevation angle); these components are, respectively, the distance between the three-dimensional point and origin O1, the angle of the direction passing through origin O1 and the three-dimensional point with respect to a reference direction passing through origin O1 on the XY plane, and the angle of the direction passing through origin O1 and the three-dimensional point with respect to the XY plane. Reference frame 310 in FIG. 8 includes three-dimensional points for which an arbitrary second position is set as origin O2. Each of the three-dimensional points in reference frame 310 has a distance component, a first angle component (a horizontal angle), and a second angle component (an elevation angle); these components are, respectively, the distance between the three-dimensional point and origin O2, the angle of the direction passing through origin O2 and the three-dimensional point with respect to a reference direction passing through origin O2 on the XY plane, and the angle of the direction passing through origin O2 and the three-dimensional point with respect to the XY plane. Current frame 300 is an example of a first frame. Reference frame 310 is an example of a second frame.

In FIG. 8, a single-hatched circle represents current point 301. Current point 301 is a point to be encoded in encoding, and a point to be decoded in decoding. White circles represent processed points 302. Processed points 302 are encoded three-dimensional points in encoding, and decoded three-dimensional points in decoding. Cross-hatched circles represent three-dimensional points 311, 312, and 313 that are inter prediction candidate points. Three-dimensional points 311, 312, and 313 as inter prediction candidate points are candidates for calculating a residual relative to the current point in inter prediction. Dashed-line circles represent unprocessed points 303. Unprocessed points 303 are unencoded three-dimensional points in encoding, i.e., three-dimensional points yet to be subjected to an encoding process, and undecoded three-dimensional points in decoding, i.e., three-dimensional points yet to be subjected to a decoding process.

In FIG. 8, current point 301 is a three-dimensional point in a point cloud included in current frame 300. In inter prediction, a prediction point for calculating a residual relative to current point 301 is selected from a point cloud (processed three-dimensional points) included in reference frame 310 different from current frame 300. Three-dimensional data encoding devices 100 and 130 or three-dimensional data decoding devices 120 and 150 determine, from among three-dimensional points 311, 312, and 313 in reference frame 310, the inter prediction point for current point 301 in current frame 300. For example, three-dimensional data encoding devices 100 and 130 or three-dimensional data decoding devices 120 and 150 may use, as the prediction point, three-dimensional point 311 having an angle component (e.g., a horizontal angle) that is the same as or similar to that of current point 301, and encode the position of current point 301. It is to be noted that a similar angle component means an angle component with a difference not greater than a predetermined value. Current point 301 is an example of a first three-dimensional point. A first angle represented by the horizontal angle of three-dimensional point 311 is similar to a second angle represented by the horizontal angle of current point 301. It can also be stated that the first angle corresponds to the second angle. Three-dimensional point 311 is an example of a second three-dimensional point.

The inter prediction candidate points may be selected to include three-dimensional point 312, which is after three-dimensional point 311 in the processing order. The inter prediction candidate points may also be selected to include three-dimensional point 311 at a position corresponding to current point 301 in current frame 300, and three-dimensional point 312, which is after three-dimensional point 311 in the processing order. Three-dimensional point 312 is an example of a third three-dimensional point. Here, the processing order is the encoding order in encoding, and the decoding order in decoding. The processing order may also be, for example, an order in which three-dimensional points are generated based on the result of measurement performed by a sensor (e.g., a LiDAR) that, while rotating, emits laser light around the sensor to measure the distances and directions to objects, thereby generating three-dimensional points.

In intra prediction, the positions of processed points 302 are already obtained, which are three-dimensional points before current point 301 in the processing order in current frame 300. However, the positions of unprocessed points 303, which are three-dimensional points after current point 301 in the processing order, are not obtained yet. In inter prediction, the prediction point is selected from reference frame 310 consisting of processed three-dimensional points. The inter prediction candidate points may therefore be selected to include three-dimensional point 311 at a position corresponding to current point 301, as well as three-dimensional point 312 immediately after three-dimensional point 311 in the processing order. Thus, three-dimensional points 311 and 312 likely to be at positions different from the position of the intra prediction candidate point can be added to the prediction candidate points. This may allow selecting, as the prediction point, a three-dimensional point likely to be at a position closer to current point 301. It may therefore be possible to reduce the residual between current point 301 and the prediction point, thereby improving the coding efficiency.

Each three-dimensional point of the point cloud in current frame 300 and each corresponding three-dimensional point of the point cloud in reference frame 310 may have the same index value (Laser ID) of the elevation angle of the scan line of the sensor (e.g., a LiDAR) that measured the positions of the three-dimensional points. Alternatively, each three-dimensional point of the point cloud in current frame 300 and each corresponding three-dimensional point of the point cloud in reference frame 310 may have different index values (Laser ID) of the elevation angle of the scan line of the sensor (e.g., a LiDAR) that measured the positions of the three-dimensional points. That is, a first index value (first Laser ID) of the elevation angle of each three-dimensional point in current frame 300 and a second index value (second Laser ID) of the elevation angle of each corresponding three-dimensional point in reference frame 310 may be the same or different.

The example in FIG. 8 selects the following inter prediction candidate points: three-dimensional point 311 having an angle component in reference frame 310 that is the same as or similar to the horizontal angle (Azimuthal Position) of current point 301; three-dimensional point 312 immediately after three-dimensional point 311 in the processing order; and three-dimensional point 313 immediately before three-dimensional point 311 in the processing order. Alternatively, only some of these three-dimensional points may be selected as the inter prediction candidate points. For example, three-dimensional points 311 and 312 may be selected as the inter prediction candidate points. Also in the example in FIG. 8, three-dimensional point 312 immediately after three-dimensional point 311 in the processing order is selected as an inter prediction candidate point after three-dimensional point 311 in the processing order. Alternatively, a predetermined number of three-dimensional points immediately after three-dimensional point 311 in the processing order may be selected. Similarly, in the example in FIG. 8, three-dimensional point 313 immediately before three-dimensional point 311 in the processing order is selected as an inter prediction candidate point before three-dimensional point 311 in the processing order. Alternatively, a predetermined number of three-dimensional points immediately before three-dimensional point 311 in the processing order may be selected. The predetermined number may be two or may be an integer greater than two. Points coming after in the processing order may also be expressed as subsequent points in the processing order, and points coming before in the processing order may also be expressed as preceding points in the processing order.

Figure 9:
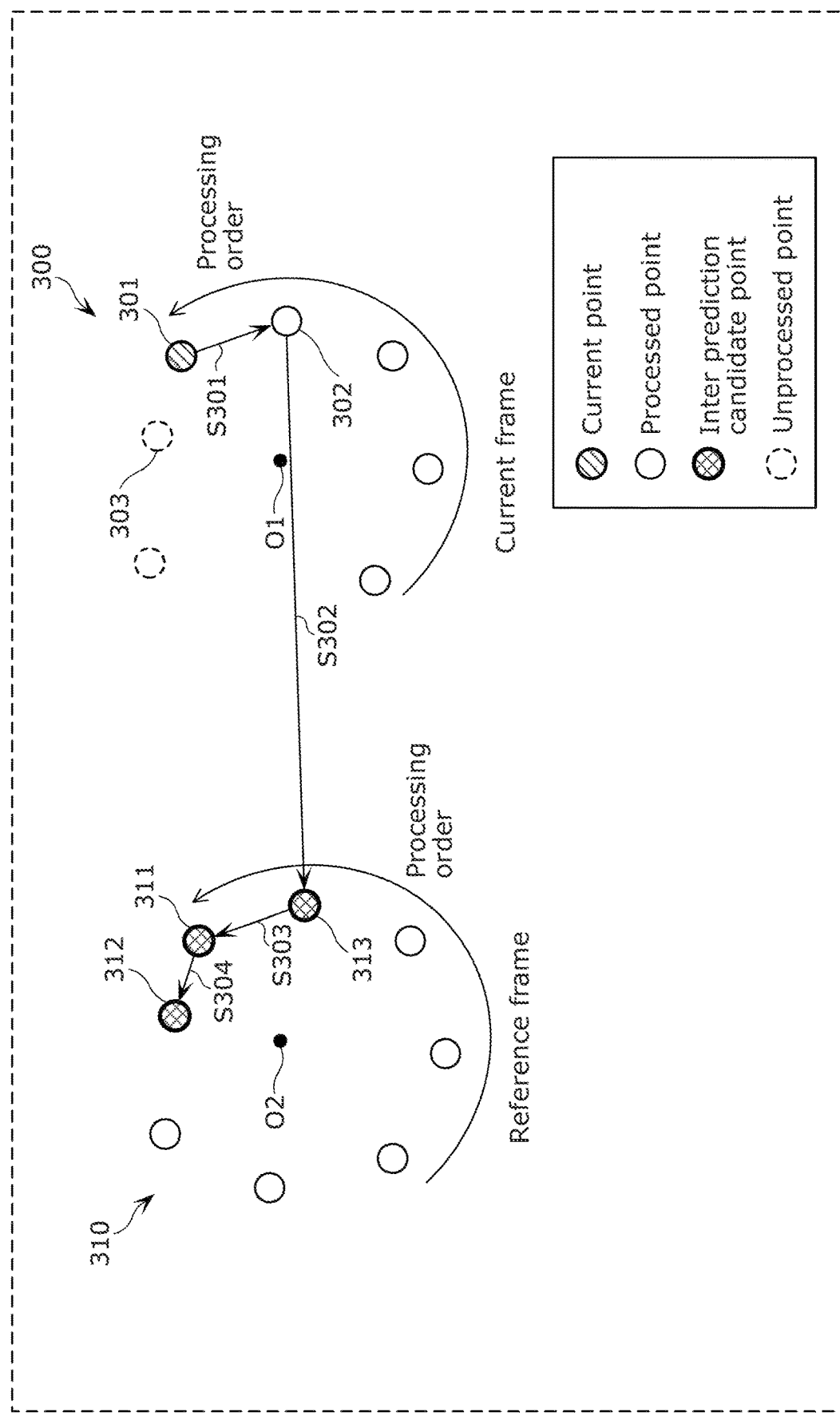
FIG. 9 is a diagram for describing an example of a procedure of determining an inter prediction candidate point in the inter prediction method according to the embodiment.

FIG. 9 is a diagram for describing an example of a procedure of determining the inter prediction candidate points in the inter prediction method according to the embodiment. FIG. 9 illustrates current frame 300 and reference frame 310 as in FIG. 8.

Because the position of current point 301 has not been determined, three-dimensional data encoding devices 100 and 130 or three-dimensional data decoding devices 120 and 150 select, in current frame 300, processed point 302 before current point 301 in the processing order (S301). This determines a reference position for current point 301. For example, processed point 302 may be a three-dimensional point processed (i.e., encoded or decoded) last in the point cloud of current frame 300 among three-dimensional points having the same index value (Laser ID) of the elevation angle of the scan line of the sensor as current point 301. Processed point 302 may be selected in any manner that can be employed by both three-dimensional data encoding devices 100 and 130 and three-dimensional data decoding devices 120 and 150. Processed point 302 is an example of a sixth three-dimensional point.

Three-dimensional data encoding devices 100 and 130 or three-dimensional data decoding devices 120 and 150 select, in reference frame 310, three-dimensional point 313 having an angle component of the horizontal angle that is the same as or similar to that of processed point 302 selected at above step S301 (S302). Three-dimensional point 313 selected may be determined to be a third prediction point. Three-dimensional point 313 is an example of a seventh three-dimensional point.

Three-dimensional data encoding devices 100 and 130 or three-dimensional data decoding devices 120 and 150 select three-dimensional point 311 (S303). Specifically, three-dimensional point 311 has an angle component of the horizontal angle that is away from three-dimensional point 313 selected at above step S302, in the direction of the processing-order arrow by a distance determined based on the sampling rate of the sensor. The devices estimate that the angle component of the horizontal angle of three-dimensional point 311 in reference frame 310 is likely to be close to that of current point 301. Three-dimensional point 311 selected may be determined to be a first prediction point.

Further, as at above step S303, three-dimensional data encoding devices 100 and 130 or three-dimensional data decoding devices 120 and 150 select three-dimensional point 312 (S304). Specifically, three-dimensional point 312 has an angle component of the horizontal angle that is away from three-dimensional point 311 selected at above step S303, in the direction of the processing-order arrow by a distance determined based on the sampling rate of the sensor. The devices estimate that three-dimensional point 312 is the three-dimensional point at the next sampling point. Three-dimensional point 312 selected may be determined to be a second prediction point.

At steps S303 and S304, three-dimensional data encoding devices 100 and 130 or three-dimensional data decoding devices 120 and 150 might fail to find three-dimensional points having an angle component of the horizontal angle that is away in the direction of the processing-order arrow by a distance determined based on the sampling rate of the sensor. The devices may then continue searching until they find such three-dimensional points. This search may be repeated, for example until two three-dimensional points located after current point 301 in the processing order are found.

In steps S303 and S304, the distance determined based on the sampling rate of the sensor may be the sampling rate itself of the sensor or may be the sampling rate of the sensor rounded to, e.g., a power of two. Notification of the distance determined based on the sampling rate of the sensor may be, for example, provided in a header such as the GPS by three-dimensional data encoding devices 100 and 130 to three-dimensional data decoding devices 120 and 150. In steps S302 to S304, a possible manner of selecting the three-dimensional point having the same or similar angle component of the horizontal angle may include searching for a point at the smallest distance in each of the positive and negative directions of the horizontal angle, and selecting one at the smaller distance of the two points at the smallest distances in the positive and negative directions. The three-dimensional point having the same or similar angle component of the horizontal angle may be selected in any manner that can be employed by both three-dimensional data encoding devices 100 and 130 and three-dimensional data decoding devices 120 and 150. Only a fixed one of the positive and negative directions of the horizontal angle may be searched to select a point at the smallest distance.

The processing order of the three-dimensional points included in one frame (i.e., the encoding order or the decoding order) may be determined to be repetitions of: a round at a first horizontal angle with the elevation angle changed in a first rotation direction; a round at a second horizontal angle with the elevation angle changed in the first rotation direction, etc. In this processing order, step S301 may be skipped and step S302 may be performed to determine the first prediction point with reference to current point 301. In this case, the third prediction point may be determined in a manner similar to step S303 or S304 with reference to the first prediction point in the direction opposite to the processing-order arrow in FIG. 9. Alternatively, with reference to the index (column_pos) of the horizontal angle of the reference point for the first prediction point, a point that refers to a reference point corresponding to subsequently processed column_pos may be selected as the second prediction point, and a point that refers to a reference point corresponding to precedingly processed column_pos may be selected as the third prediction point.

Figure 10:
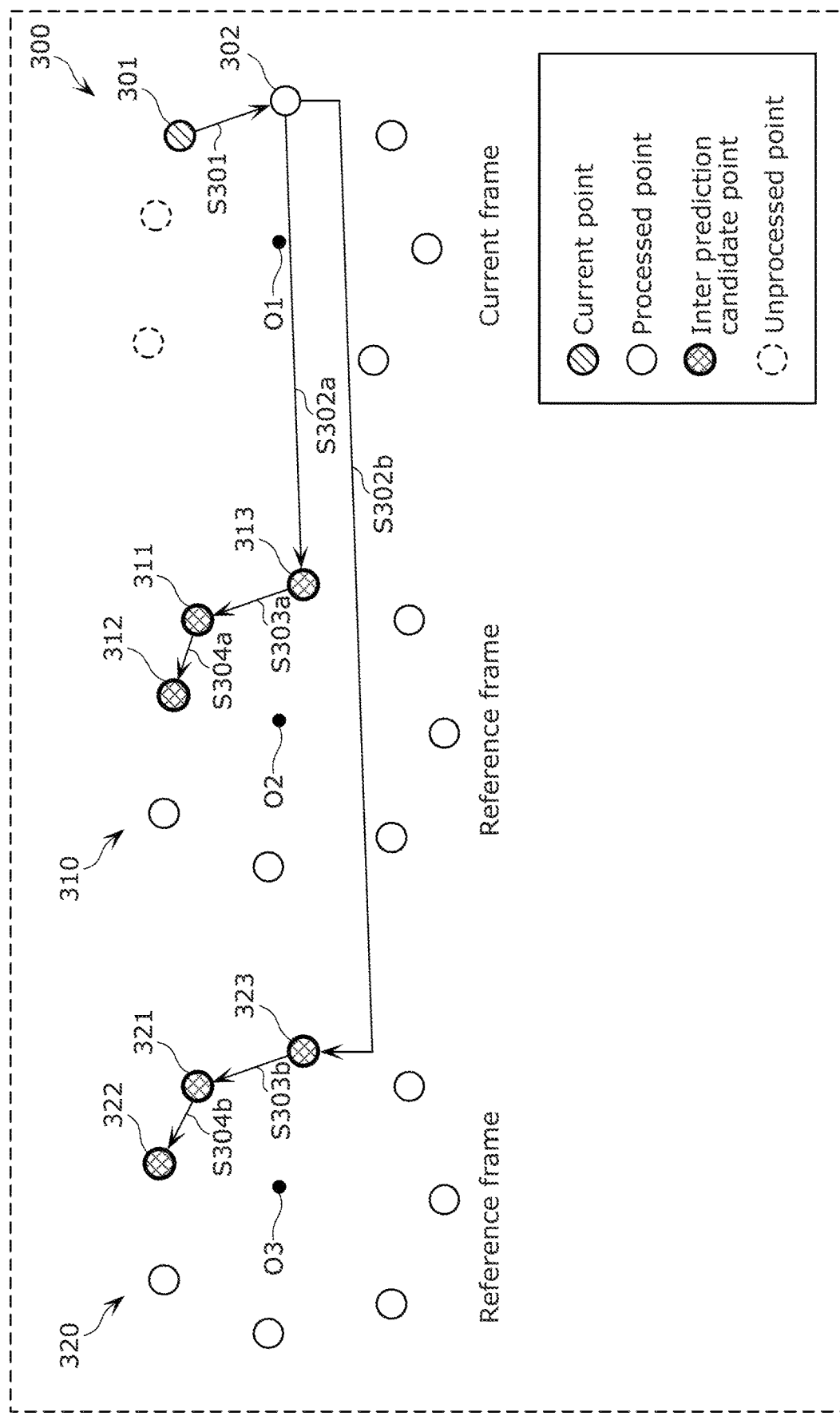
FIG. 10 is a diagram for describing an example of the inter prediction method extended for inter prediction involving multiple reference frames.

FIG. 10 is a diagram for describing an example of the inter prediction method extended for inter prediction involving multiple reference frames. In addition to current frame 300 and reference frame 310 as in FIG. 8, FIG. 10 further illustrates reference frame 320. Reference frame 320 in FIG. 10 includes three-dimensional points for which an arbitrary third position is set as origin O3. Each of the three-dimensional points in reference frame 320 has a distance component, a first angle component (a horizontal angle), and a second angle component (an elevation angle); these components are, respectively, the distance between the three-dimensional point and origin O3, the angle of the direction passing through origin O3 and the three-dimensional point with respect to a reference direction passing through origin O3 on the XY plane, and the angle of the direction passing through origin O3 and the three-dimensional point with respect to the XY plane. Reference frame 320 is an example of a third frame.

In each of the reference frames, the procedure described with reference to FIG. 9 is applied to determine the first prediction point, the second prediction point, and the third prediction point.

Because the position of current point 301 has not been determined, three-dimensional data encoding devices 100 and 130 or three-dimensional data decoding devices 120 and 150 select, in current frame 300, processed point 302 before current point 301 in the processing order (S301). This determines a reference position for current point 301. For example, processed point 302 may be a three-dimensional point processed (i.e., encoded or decoded) last in the point cloud of current frame 300 among three-dimensional points having the same index value (Laser ID) of the elevation angle of the scan line of the sensor as current point 301. Processed point 302 may be selected in any manner that can be employed by both three-dimensional data encoding devices 100 and 130 and three-dimensional data decoding devices 120 and 150.

Three-dimensional data encoding devices 100 and 130 or three-dimensional data decoding devices 120 and 150 select, in reference frame 310, three-dimensional point 313 having an angle component of the horizontal angle that is the same as or similar to that of processed point 302 selected at above step S301 (S302a). Three-dimensional point 313 selected may be determined to be the third prediction point.

Similarly, three-dimensional data encoding devices 100 and 130 or three-dimensional data decoding devices 120 and 150 select, in reference frame 320 different from reference frame 310, three-dimensional point 323 having an angle component of the horizontal angle that is the same as or similar to that of processed point 302 selected at above step S301 (S302b). Three-dimensional point 323 selected may be determined to be the third prediction point.

Three-dimensional data encoding devices 100 and 130 or three-dimensional data decoding devices 120 and 150 select three-dimensional point 311 in reference frame 310 (S303a). Specifically, three-dimensional point 311 has an angle component of the horizontal angle that is away from three-dimensional point 313 selected at above step S302a, in the direction of the processing-order arrow by a distance determined based on the sampling rate of the sensor. The devices estimate that the angle component of the horizontal angle of three-dimensional point 311 in reference frame 310 is likely to be similar to that of current point 301. Three-dimensional point 311 selected may be determined to be the first prediction point. Three-dimensional point 311 is an example of the second three-dimensional point.

Similarly, three-dimensional data encoding devices 100 and 130 or three-dimensional data decoding devices 120 and 150 select three-dimensional point 321 in reference frame 320 (S303b). Specifically, three-dimensional point 321 has an angle component of the horizontal angle that is away from three-dimensional point 323 selected at above step S302b, in the direction of the processing-order arrow by a distance determined based on the sampling rate of the sensor. The devices estimate that the angle component of the horizontal angle of three-dimensional point 321 in reference frame 320 is likely to be similar to that of current point 301. Three-dimensional point 321 selected may be determined to be the first prediction point. Three-dimensional point 321 is an example of a fourth three-dimensional point.

Further, as at above step S303a, three-dimensional data encoding devices 100 and 130 or three-dimensional data decoding devices 120 and 150 select three-dimensional point 312 in reference frame 310 (S304a). Specifically, three-dimensional point 312 has an angle component of the horizontal angle that is away from three-dimensional point 311 selected at above step S303a, in the direction of the processing-order arrow by a distance determined based on the sampling rate of the sensor. The devices estimate that three-dimensional point 312 is the three-dimensional point at the next sampling point. Three-dimensional point 312 selected may be determined to be the second prediction point. Three-dimensional point 312 is an example of the third three-dimensional point.

Similarly, as at above step S303b, three-dimensional data encoding devices 100 and 130 or three-dimensional data decoding devices 120 and 150 select three-dimensional point 322 in reference frame 320 (S304b). Specifically, three-dimensional point 322 has an angle component of the horizontal angle that is away from three-dimensional point 321 selected at above step S303b, in the direction of the processing-order arrow by a distance determined based on the sampling rate of the sensor. The devices estimate that three-dimensional point 322 is the three-dimensional point at the next sampling point. Three-dimensional point 322 selected may be determined to be the second prediction point. Three-dimensional point 322 is an example of a fifth three-dimensional point.

At steps S303a and S303b and steps S304a and S304b, three-dimensional data encoding devices 100 and 130 or three-dimensional data decoding devices 120 and 150 might fail to find three-dimensional points having an angle component of the horizontal angle that is away in the direction of the processing-order arrow by a distance determined based on the sampling rate of the sensor. The devices may then continue searching until they find such three-dimensional points. This search may be repeated, for example until two three-dimensional points located after current point 301 in the processing order are found in each reference frame.

Although the above example illustrates the case of using two reference frames, three or more reference frames may be used to apply a similar process. Although the above example illustrates the case in which three prediction points are selected in each reference frame, different number of prediction points may be selected in different reference frames.

Figure 11:
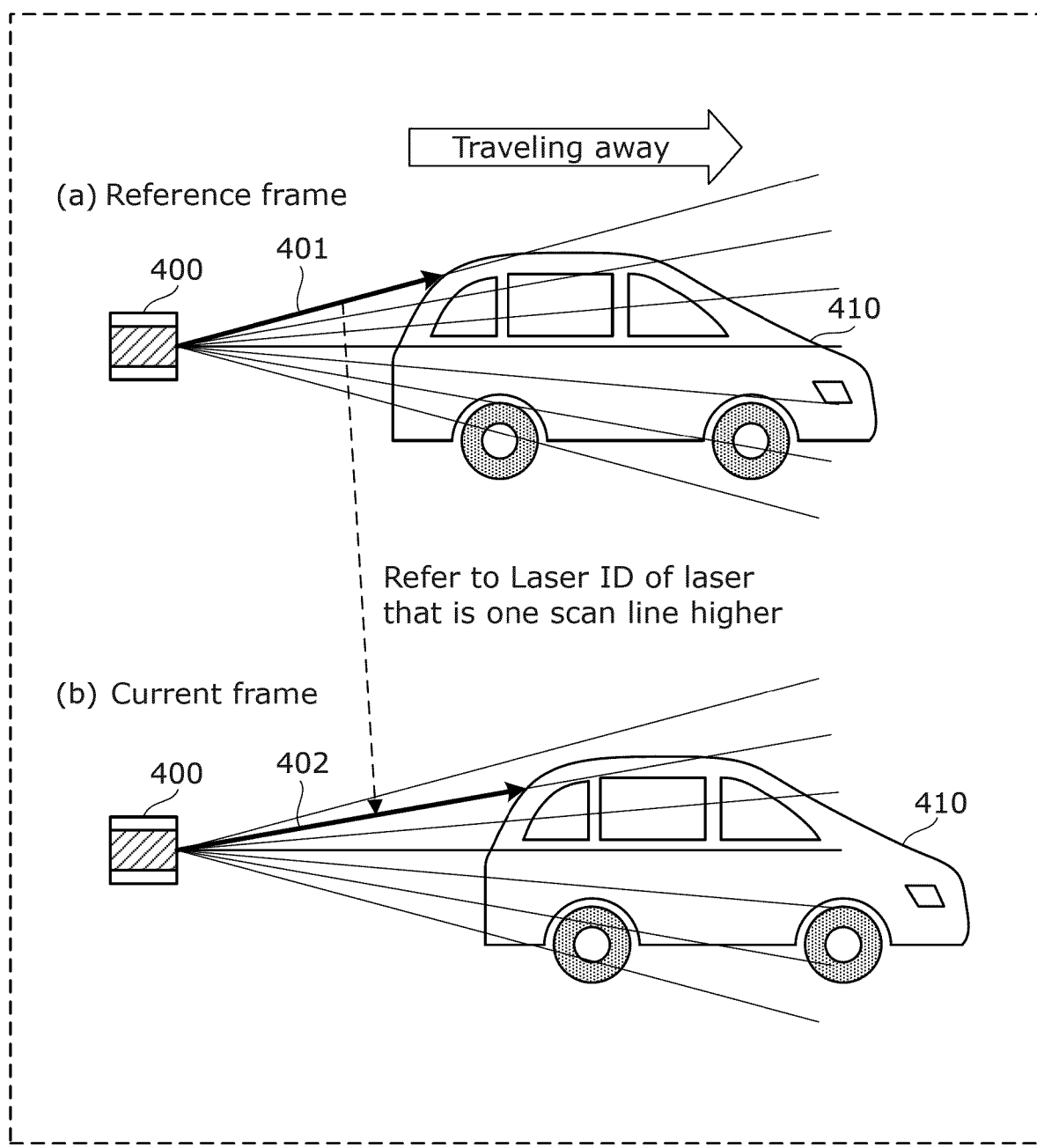
FIG. 11 is a diagram for describing an example in which a method of determining a prediction point is applied to elevation angle directions.
Figure 12:
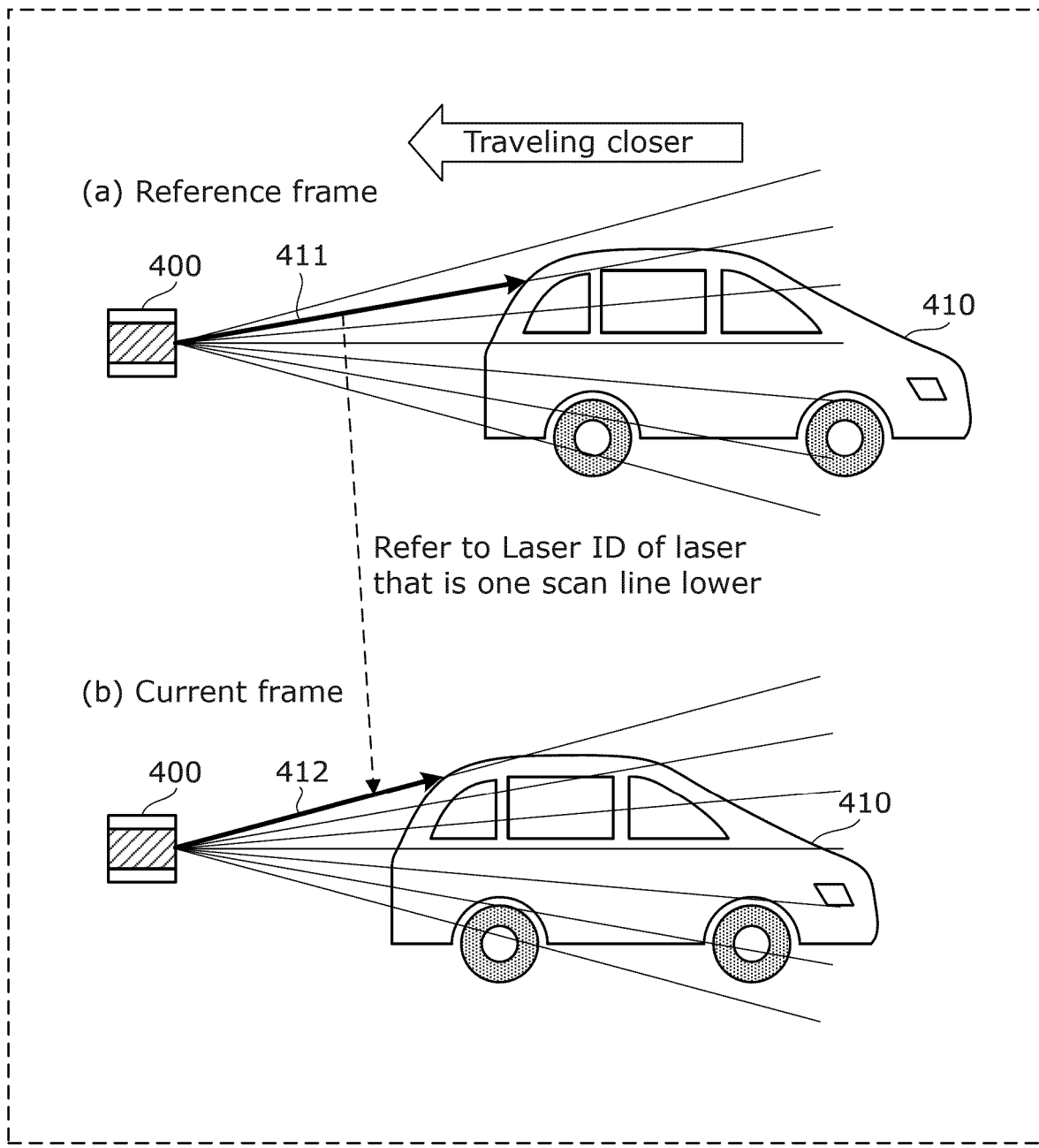
FIG. 12 is a diagram for describing an example in which a method of determining a prediction point is applied to elevation angle directions.

FIGS. 11 and 12 are diagrams for describing examples in which the method of determining the prediction point is applied to elevation angle directions. FIG. 11 illustrates an example in which measurement target 410 is traveling away from sensor 400. FIG. 12 illustrates an example in which measurement target 410 is traveling closer to sensor 400. FIGS. 11 and 12 each illustrate a relative positional relationship between sensor 400 and measurement target 410 in an example in which at least one of sensor 400 and measurement target 410 is traveling.

Sensor 400 is a LiDAR. Lines extending radially from the sensor represent laser paths toward measurement target 410. Three-dimensional data encoding devices 100 and 130 and three-dimensional data decoding devices 120 and 150 may perform inter prediction by adding, to the prediction point candidates, a three-dimensional point included in a laser of Laser ID of an elevation angle different from the elevation angle of Laser ID of a laser including the current point. For example, as illustrated in FIG. 11, measurement target 410 may be farther from sensor 400 when the point cloud of the current frame is measured than when the point cloud of the reference frame was measured. Three-dimensional data encoding devices 100 and 130 and three-dimensional data decoding devices 120 and 150 may perform inter prediction of the current point in laser 402 by adding, to the prediction point candidates, a three-dimensional point in laser 401. Laser 401 has Laser ID of an elevation angle farther from the horizontal reference than the elevation angle of Laser ID of laser 402 (i.e., is above laser 402). By contrast, for example, as illustrated in FIG. 12, measurement target 410 may be closer to sensor 400 when the point cloud of the current frame is measured than when the point cloud of the reference frame was measured. Three-dimensional data encoding devices 100 and 130 and three-dimensional data decoding devices 120 and 150 may perform inter prediction of the current point in laser 412 by adding, to the prediction point candidates, a three-dimensional point in laser 411. Laser 411 has Laser ID of an elevation angle closer to the horizontal reference than the elevation angle of Laser ID of laser 412 (i.e., is below laser 412).

Thus, if the distance between sensor 400 and measurement target 410 varies, three-dimensional data encoding devices 100 and 130 and three-dimensional data decoding devices 120 and 150 may perform inter prediction by adding, to the prediction point (Predictor) candidates, a three-dimensional point included in Laser ID different from Laser ID including the current point. This may achieve improved prediction efficiency.

FIG. 13 illustrates an example of a syntax for a three-dimensional point according to the embodiment. This syntax is an example of each node in a prediction tree.

InterFrameFlag indicates whether inter prediction is enabled. InterFrameFlag is set according to a higher-level syntax (such as the SPS, GPS, or slice header). The SPS is a parameter set (control information) for each sequence including multiple frames. The SPS is also a parameter set common to geometry information and attribute information. The GPS is a parameter set for each frame and is a parameter set for geometry information.

intra_pred_flag indicates whether the prediction method at the current point is intra prediction or not (i.e., inter prediction). Notification of intra_pred_flag may be provided if InterFrameFlag indicates that inter prediction is enabled for the frame including the three-dimensional point corresponding to this syntax. intra_pred_flag may be set to a value (e.g., 1) indicating intra prediction if InterFrameFlag indicates that inter prediction is disabled for this frame.

pred_mode indicates a prediction mode. The prediction mode is information indicating how the intra prediction point for the current point is determined. The prediction mode indicates the manner in which the prediction point is calculated based on the position(s) of one or more higher nodes for the current node in the prediction tree. Depending on pred_mode, notification of additional information for determining the intra prediction point may be provided.

inter_ref_frame_idx is information specifying the point cloud in the processing unit (e.g., a frame) referred to in the inter prediction of the current point. That is, the frame specified by inter_ref_frame_idx includes the prediction point for the inter prediction of the current point. Notification of inter_ref_frame_idx may be provided if intra_pred_flag is set to a value indicating inter prediction (e.g., 0) and if the number of reference frames NumRefFrames set according to a higher-level syntax (such as the SPS, GPS, or slice header) is greater than 1. If NumRefFrames is 1, notification of inter_ref_frame_idx may be omitted because the reference frame can be uniquely identified. inter_ref_frame_idx is an example of first identification information. The first identification information may be any information that identifies the point cloud in the processing unit including the prediction point for the inter prediction of the current point. The processing unit for the point cloud need not be limited to a frame but may be a slice.

inter_ref_point_idx is information that specifies the prediction point (Predictor) referred to in the inter prediction of the current point. Notification of inter_ref_point_idx may be provided if the number of prediction points in the reference frame NumRefPoints is greater than 1. If NumRefPoints is 1, notification of inter_ref_point_idx may be omitted because the prediction point can be uniquely identified. inter_ref_point_idx is an example of second identification information. The second identification information is information that identifies the prediction point for the inter prediction of the current point.

Thus, if there are multiple prediction points, notification of inter_ref_point_idx can be provided so that a prediction point can be specified among those determined by the inter prediction method. This allows consistent prediction processing to be performed in three-dimensional data encoding devices 100 and 130 and three-dimensional data decoding devices 120 and 150.

Next, three-dimensional data encoding devices 100 and 130 may give notification of a first difference (1st_residual_value) between geometry information (coordinate values) of the point to be encoded or to be decoded and geometry information (coordinate values) of the prediction point. It should be noted that there are cases where geometry information of a prediction point is called a predicted value. There are also cases where attribute information of a prediction point is called a predicted value. In the case where coordinate transformation of a decoded point is performed before each three-dimensional point is output from three-dimensional data decoding devices 120 and 150 (e.g., gps_coordinate_trans_enabled_flag=1), notification of a second difference (2nd_residual_value) between geometry information (coordinate values) obtained by performing coordinate transformation to an original coordinate system such as the Cartesian coordinate system on a result of decoding in another coordinate system such as the polar coordinate system and original geometry information (coordinate values) may be given. Although an example of giving the notification of these items of difference information in one type of syntax is described, the notification of the items of difference information may be given in types of syntax such as positive-negative information and absolute value information.

Notification of these information items (InterFrameFlag, intra_pred_flag, pred_mode, inter_ref_franne_idx, inter_ref_point_idx, 1st_residual_value, and 2nd_residual_value) may be provided by three-dimensional data encoding devices 100 and 130 to three-dimensional data decoding devices 120 and 150. This allows consistent prediction processing to be performed in three-dimensional data encoding devices 100 and 130 and three-dimensional data decoding devices 120 and 150. Three-dimensional data decoding devices 120 and 150 can therefore perform decoding without inconsistency with corresponding three-dimensional data encoding devices 100 and 130.

Thus, inter prediction with multiple prediction points may be used to predict information on the current point. It may therefore be possible to improve the accuracy of the prediction of the current point, thereby reducing the code amount.

It should be noted that the devices or processes, syntax, and so on, disclosed using FIG. 1 to FIG. 13 may be implemented by being combined with at least part of another embodiment. Furthermore, part of the devices or processes, syntax, and so on, disclosed using FIG. 1 to FIG. 13 may be implemented by being combined with another embodiment. Moreover, all of the structural components disclosed using FIG. 1 to FIG. 13 are not necessarily all required, and it is acceptable to have only some of the structural components included.

Figure 14:
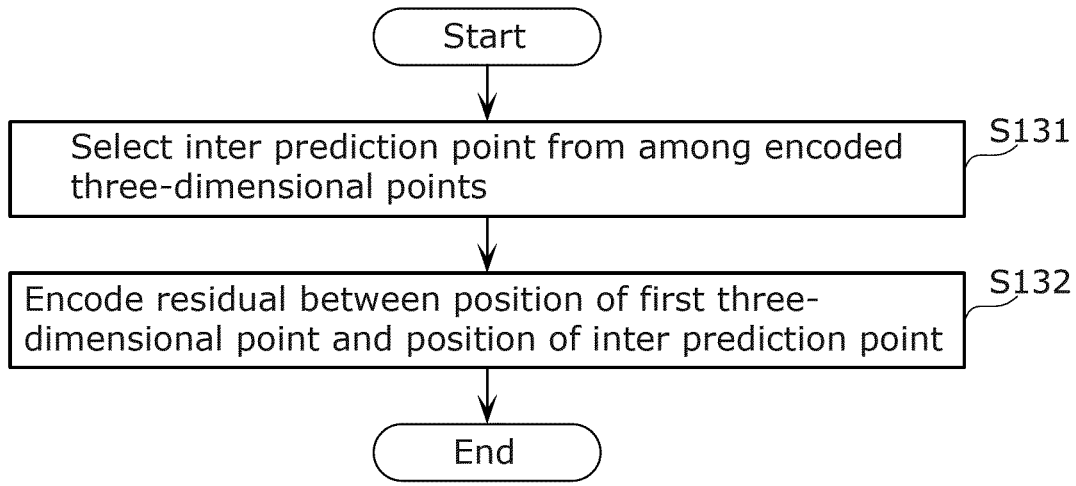
FIG. 14 is a flowchart illustrating an example of a three-dimensional data encoding process according to the embodiment.

As described above, three-dimensional data encoding devices 100 and 130 perform the process (three-dimensional data encoding method) illustrated in FIG. 14. Three-dimensional data encoding devices 100 and 130 select, from among encoded three-dimensional points, an inter prediction point of a first three-dimensional point among three-dimensional points, the three-dimensional points each having a position represented by a distance component and a first angle component (S131). Three-dimensional data encoding devices 100 and 130 encode a residual between a position of the first three-dimensional point and a position of the inter prediction point (S132). The encoded three-dimensional points include a third three-dimensional point that is after a second three-dimensional point in encoding order. A second angle represented by a first angle component of the second three-dimensional point corresponds to a first angle represented by a first angle component of the first three-dimensional point. It should be noted that the first three-dimensional point is, for example, current point 301. The second three-dimensional point is, for example, three-dimensional point 311. The third three-dimensional point is, for example, three-dimensional point 312.

In other words, with this aspect, it may be possible to select, as the inter prediction point, a third three-dimensional point that is subsequent in encoding order to a second three-dimensional point that has an angle corresponding to the angle of the first three-dimensional point to be encoded. Accordingly, it may be possible to reduce a distance residual. However, the position residual may be the residual of the second angle component or may be both the distance residual and the residual of the second angle composition.

For example, the total number of the encoded three-dimensional points is two.

Accordingly, since it is possible to have two points as candidates of the inter prediction point, the processing amount of the process of selecting one inter prediction point from among the two encoded three-dimensional points can be reduced.

For example, the third three-dimensional point is one place after the second three-dimensional point in encoding order.

With this aspect, it is highly likely that a third three-dimensional point located at a position corresponding to an angle that is close to the angle of the first three-dimensional point will be selected as an inter prediction point. Therefore, with this aspect, it may be possible to further reduce the position residual.

The third three-dimensional point may also be a point that is two or more places after the second three-dimensional point in the encoding order. This may be the case in the following situation. Multiple electromagnetic waves for detection (e.g., laser beams) output from the sensor (e.g., a LiDAR) may be received at the same position (horizontal angle), in which case multiple three-dimensional points are generated at the same position (horizontal angle). These three-dimensional points are encoded in the same order as the order in which these three-dimensional points were generated by the sensor. Therefore, to reduce the residual, it may be necessary to set, as the inter prediction point, the third three-dimensional point that is two or more places after the second three-dimensional point in the encoding order. It may thus be possible to further reduce the residual by setting, as the inter prediction point, the third three-dimensional point that is two or more places after the second three-dimensional point in the encoding order.

For example, the three-dimensional points are each represented by the distance component, the first angle component, and a second angle component. The first angle component is a horizontal angle component. The second angle component is an elevation angle component. The second angle component is common to the first three-dimensional point, the second three-dimensional point, and the third three-dimensional point.

Accordingly, since the second angle component is common to the first three-dimensional point, the second three-dimensional point, and the third three-dimensional point, it may be possible to further reduce the position residual.

For example, three-dimensional data encoding devices 100 and 130 further generate a bitstream including the residual and first designation information indicating a three-dimensional point selected as the inter prediction point. The first designation information is, for example, inter_ref_point_idx.

With this aspect, the same inter prediction point can be selected as that in the encoding side.

For example, with regard to the encoded three-dimensional points, in addition, the first three-dimensional point is included in a first frame. The second three-dimensional point and the third three-dimensional point are included in a second frame different from the first frame. The encoded three-dimensional points further include a fourth three-dimensional point and a fifth three-dimensional point, the fourth three-dimensional point being included in a third frame different from the first frame and the second frame, the fifth three-dimensional point being included in the third frame and being after the fourth three-dimensional point in encoding order. A third angle represented by a first angle component of the fourth three-dimensional point corresponds to the first angle. The first frame is, for example, current frame 300. The second frame is, for example, reference frame 310. The third frame is, of example, reference frame 320. The fourth three-dimensional point is, for example, three-dimensional point 321. The fifth three-dimensional point is, for example, three-dimensional point 322.

In other words, with this aspect, multiple frames are used as reference frames. Therefore, the first three-dimensional point can be appropriately decoded based on a position residual that could possibly have been calculated to be even smaller.

For example, three-dimensional data encoding devices 100 and 130 further generate a bitstream including the residual, first designation information, and second designation information, the first designation information indicating a three-dimensional point selected as the inter prediction point, the second designation information indicating a frame in which the three-dimensional point selected is included. The second designation information is, for example, inter_ref_frame_idx.

With this aspect, the same inter prediction point can be selected as that in the encoding side.

For example, three-dimensional data encoding devices 100 and 130 further identify a sixth three-dimensional point that is one place before the first three-dimensional point in encoding order. Three-dimensional data encoding devices 100 and 130 further identify a seventh three-dimensional point in a second frame different from the first frame. Three-dimensional data encoding devices 100 and 130 further identify the third three-dimensional point in the second frame, the third three-dimensional point being two places after the seventh three-dimensional point in encoding order. A fifth angle represented by a first angle component of the seventh three-dimensional point corresponds to a fourth angle represented by a first angle component of the sixth three-dimensional point. The sixth three-dimensional point is, for example, processed point 302. The seventh three-dimensional point is, for example, three-dimensional point 313.

With this aspect, first, the three-dimensional data decoding device identifies a sixth three-dimensional point that is one place before the first three-dimensional point in decoding order. Then, the three-dimensional data decoding device can identify a third three-dimensional point that is two places after a second three-dimensional point in decoding order by identifying, from the second frame, a seventh three-dimensional point that has a first angle component that corresponds to the first angle component of the sixth three-dimensional point identified, and identifying a three dimensional point that that is two places after the seventh three-dimensional point in decoding order. Even when the second three-dimensional point that has a second angle that corresponds to the first angle of the first three-dimensional point is not present, with this aspect, it is possible to identify the third three-dimensional point that has an angle that is close to the first angle.

For example, each of three-dimensional data encoding devices 100 and 130 includes a processor and memory, and the processor performs the above process using the memory.

Figure 15:
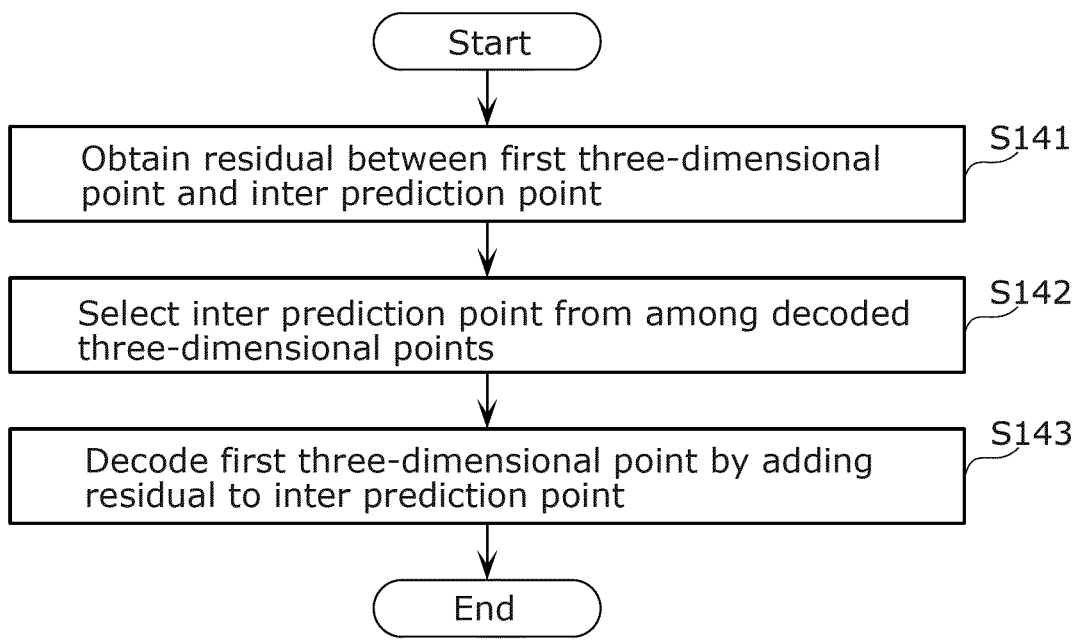
FIG. 15 is a flowchart illustrating an example of a three-dimensional data decoding process according to the embodiment.

Furthermore, three-dimensional data decoding devices 120 and 150 perform the process (three-dimensional data decoding method) illustrated in FIG. 15. Three-dimensional data decoding devices 120 and 150 obtain a residual between a first three-dimensional point and an inter prediction point, the first three-dimensional point being included among three-dimensional points each having a position represented by a distance component and a first angle component (S141). Three-dimensional data decoding devices 120 and 150 select the inter prediction point from among decoded three-dimensional points (S142). Three-dimensional data decoding devices 120 and 150 decode the first three-dimensional point by adding the residual to the inter prediction point (S143). The decoded three-dimensional points include a third three-dimensional point that is after a second three-dimensional point in decoding order. A second angle represented by a first angle component of the second three-dimensional point corresponds to a first angle represented by a first angle component of the first three-dimensional point. It should be noted that the first three-dimensional point is, for example, current point 301. The second three-dimensional point is, for example, three-dimensional point 311. The third three-dimensional point is, for example, three-dimensional point 312.

In other words, with this aspect, it may be possible to select, as the inter prediction point, a third three-dimensional point that is subsequent in decoding order to the second three-dimensional point that has an angle corresponding to the angle of the first three-dimensional point to be decoded. Accordingly, the first three-dimensional point can be appropriately decoded based on a distance residual that could possibly have been calculated to be small. However, the position residual may be the residual of the second angle component or may be both the distance residual and the residual of the second angle composition.

For example, the total number of the decoded three-dimensional points is two.

Accordingly, since it is possible to have two points as candidates of the inter prediction point, the processing amount of the process of selecting one inter prediction point from among the two encoded three-dimensional points can be reduced.

For example, the third three-dimensional point is one place after the second three-dimensional point in decoding order.

With this aspect, it is highly likely that a third three-dimensional point located at a position corresponding to an angle that is close to the angle of the first three-dimensional point will be selected as an inter prediction point. Therefore, with this aspect, the first three-dimensional point can be appropriately decoded based on a position residual that could possibly have been calculated to be small.

The third three-dimensional point may also be a point that is two or more places after the second three-dimensional point in the decoding order. This may be the case in the following situation. Multiple electromagnetic waves for detection (e.g., laser beams) output from the sensor (e.g., a LiDAR) may be received at the same position (horizontal angle), in which case multiple three-dimensional points are generated at the same position (horizontal angle). These three-dimensional points are decoded in the same order as the order in which these three-dimensional points were generated by the sensor. Therefore, to reduce the residual, it may be necessary to set, as the inter prediction point, the third three-dimensional point that is two or more places after the second three-dimensional point in the decoding order. It may thus be possible to further reduce the residual by setting, as the inter prediction point, the third three-dimensional point that is two or more places after the second three-dimensional point in the decoding order.

For example, the three-dimensional points are each represented by the distance component, the first angle component, and a second angle component. The first angle component is a horizontal angle component. The second angle component is an elevation angle component. The second angle component is common to the first three-dimensional point, the second three-dimensional point, and the third three-dimensional point.

Accordingly, since the second angle component is common to the first three-dimensional point, the second three-dimensional point, and the third three-dimensional point, the first three-dimensional point can be appropriately decoded based on a position residual that could possibly have been calculated to be even smaller.

For example, three-dimensional data decoding devices 120 and 150 further obtain the residual and first designation information indicating a three-dimensional point selected as the inter prediction point. Three-dimensional data decoding devices 120 and 150 select the inter prediction point from among the decoded three-dimensional points, based on the first designation information. The first designation information is, for example, inter_ref_point_idx.

With this aspect, the same inter prediction point can be selected as that in the encoding side.

For example, with regard to the decoded three-dimensional points, in addition, the first three-dimensional point is included in a first frame. The second three-dimensional point and the third three-dimensional point are included in a second frame different from the first frame. The encoded three-dimensional points further include a fourth three-dimensional point and a fifth three-dimensional point, the fourth three-dimensional point being included in a third frame different from the first frame and the second frame, the fifth three-dimensional point being included in the third frame and being after the fourth three-dimensional point in encoding order. A third angle represented by a first angle component of the fourth three-dimensional point corresponds to the first angle. The first frame is, for example, current frame 300. The second frame is, for example, reference frame 310. The third frame is, of example, reference frame 320. The fourth three-dimensional point is, for example, three-dimensional point 321. The fifth three-dimensional point is, for example, three-dimensional point 322.

In other words, with this aspect, multiple frames are used as reference frames. Therefore, the first three-dimensional point can be appropriately decoded based on a position residual that could possibly have been calculated to be even smaller.

For example, three-dimensional data decoding devices 120 and 150 further obtain the residual, first designation information, and second designation information, the first designation information indicating a three-dimensional point selected as the inter prediction point, the second designation information indicating a frame in which the three-dimensional point selected is included. Three-dimensional data decoding devices 120 and 150 select the inter prediction point from among the decoded three-dimensional points, based on the first designation information. For example, the second designation information is, for example, inter_ref_frame_idx.

With this aspect, the same inter prediction point can be selected as that in the encoding side.

For example, three-dimensional data decoding devices 120 and 150 further identify a sixth three-dimensional point that is one place before the first three-dimensional point in decoding order. Three-dimensional data decoding devices 120 and 150 further identify a seventh three-dimensional point in a second frame different from the first frame. Three-dimensional data decoding devices 120 and 150 further identify the third three-dimensional point in the second frame, the third three-dimensional point being two places after the seventh three-dimensional point in decoding order. A fifth angle represented by a first angle component of the seventh three-dimensional point corresponds to a fourth angle represented by a first angle component of the sixth three-dimensional point. The sixth three-dimensional point is, for example, processed point 302. The seventh three-dimensional point is, for example, three-dimensional point 313.

For example, when the first angle component of the first three-dimensional point has not been obtained in the decoding of the first three-dimensional point, a sixth three-dimensional point that that is one place before the first three-dimensional point in decoding order is identified. This is because, since the sixth three-dimensional point is already decoded, three-dimensional data decoding devices 120 and 150 can obtain a fourth angle represented by the first angle component of the sixth three-dimensional point. Therefore, three-dimensional data decoding devices 120 and 150 can identify a third three-dimensional point that is two places after a second three-dimensional point in decoding order by identifying, from the second frame, a seventh three-dimensional point that has a first angle component that corresponds to the first angle component of the sixth three-dimensional point identified, and identifying a three dimensional point that is two places after the seventh three-dimensional point in decoding order.

For example, each of three-dimensional data decoding devices 120 and 150 includes a processor and memory, and the processor performs the above process using the memory.

A three-dimensional data encoding device, a three-dimensional data decoding device, and the like according to the embodiment and variations thereof of the present disclosure have been described above, but the present disclosure is not limited to these embodiments.

Note that each of the processors included in the three-dimensional data encoding device, the three-dimensional data decoding device, and the like according to the above embodiments is typically implemented as a large-scale integrated (LSI) circuit, which is an integrated circuit (IC). These may take the form of individual chips, or may be partially or entirely packaged into a single chip.

Such IC is not limited to an LSI, and thus may be implemented as a dedicated circuit or a general-purpose processor. Alternatively, a field programmable gate array (FPGA) that allows for programming after the manufacture of an LSI, or a reconfigurable processor that allows for reconfiguration of the connection and the setting of circuit cells inside an LSI may be employed.

Moreover, in the above embodiments, the structural components may be implemented as dedicated hardware or may be realized by executing a software program suited to such structural components. Alternatively, the structural components may be implemented by a program executor such as a CPU or a processor reading out and executing the software program recorded in a recording medium such as a hard disk or a semiconductor memory.

The present disclosure may also be implemented as a three-dimensional data encoding method, a three-dimensional data decoding method, or the like executed by the three-dimensional data encoding device, the three-dimensional data decoding device, and the like.

Also, the divisions of the functional blocks shown in the block diagrams are mere examples, and thus a plurality of functional blocks may be implemented as a single functional block, or a single functional block may be divided into a plurality of functional blocks, or one or more functions may be moved to another functional block. Also, the functions of a plurality of functional blocks having similar functions may be processed by single hardware or software in a parallelized or time-divided manner.

Also, the processing order of executing the steps shown in the flowcharts is a mere illustration for specifically describing the present disclosure, and thus may be an order other than the shown order. Also, one or more of the steps may be executed simultaneously (in parallel) with another step.

A three-dimensional data encoding device, a three-dimensional data decoding device, and the like according to one or more aspects have been described above based on the embodiments, but the present disclosure is not limited to these embodiments. The one or more aspects may thus include forms achieved by making various modifications to the above embodiments that can be conceived by those skilled in the art, as well forms achieved by combining structural components in different embodiments, without materially departing from the spirit of the present disclosure.

Industrial Applicability

The present disclosure is applicable to a three-dimensional data encoding device and a three-dimensional data decoding device.

The invention claimed is:

1. An encoding method for encoding three-dimensional points each having a position represented by a distance and an angle, the encoding method comprising:
identifying three-dimensional points that belong to a second processing unit and have been encoded, for inter prediction of a first three-dimensional point belonging to a first processing unit; and
selecting a reference three-dimensional point from the three-dimensional points identified to calculate an inter predicted value of the first three-dimensional point, wherein
the three-dimensional points identified include a second three-dimensional point and a third three-dimensional point, the second three-dimensional point having a second angle corresponding to a first angle of the first three-dimensional point, the third three-dimensional point having a third angle greater than the second angle.

2. The encoding method according to claim 1, wherein the second angle is substantially equal to an angle obtained by adding a specified angle to a fourth angle of a fourth three-dimensional point that belongs to the first processing unit and has been encoded immediately before encoding of the first three-dimensional point.

3. The encoding method according to claim 2, wherein a difference between the fourth angle and the second angle, a difference between the second angle and the third angle, and the specified angle are substantially equal.

4. The encoding method according to claim 1, wherein the three-dimensional points identified include three-dimensional points that belong to a third processing unit and have been encoded, and
the three-dimensional points identified that belong to the third processing unit include a fifth three-dimensional point and a sixth three-dimensional point, the fifth three-dimensional point having the second angle, the sixth three-dimensional point having a sixth angle greater than the second angle.

5. The encoding method according to claim 1, wherein in the selecting of the reference three-dimensional point, either the second three-dimensional point or the third three-dimensional point is selected based on identification information.

6. A decoding method for decoding three-dimensional points each having a position represented by a distance and an angle, the decoding method comprising:
identifying three-dimensional points that belong to a second processing unit and have been decoded, for inter prediction of a first three-dimensional point belonging to a first processing unit; and
selecting a reference three-dimensional point from the three-dimensional points identified to calculate an inter predicted value of the first three-dimensional point, wherein
the three-dimensional points identified include a second three-dimensional point and a third three-dimensional point, the second three-dimensional point having a second angle corresponding to a first angle of the first three-dimensional point, the third three-dimensional point having a third angle greater than the second angle.

7. The decoding method according to claim 6, wherein the second angle is substantially equal to an angle obtained by adding a specified angle to a fourth angle of a fourth three-dimensional point that belongs to the first processing unit and has been decoded immediately before decoding of the first three-dimensional point.

8. The decoding method according to claim 7, wherein a difference between the fourth angle and the second angle, a difference between the second angle and the third angle, and the specified angle are substantially equal.

9. The decoding method according to claim 6, wherein the three-dimensional points identified include three-dimensional points that belong to a third processing unit and have been decoded, and
the three-dimensional points identified that belong to the third processing unit include a fifth three-dimensional point and a sixth three-dimensional point, the fifth three-dimensional point having the second angle, the sixth three-dimensional point having a sixth angle greater than the second angle.

10. The decoding method according to claim 6, wherein in the selecting of the reference three-dimensional point, either the second three-dimensional point or the third three-dimensional point is selected based on identification information.

11. An encoding device that encodes three-dimensional points each having a position represented by a distance and an angle, the encoding device comprising:
a processor; and
memory, wherein
using the memory, the processor:
identifies three-dimensional points that belong to a second processing unit and have been encoded, for inter prediction of a first three-dimensional point belonging to a first processing unit; and
selects a reference three-dimensional point from the three-dimensional points identified to calculate an inter predicted value of the first three-dimensional point, wherein
the three-dimensional points identified include a second three-dimensional point and a third three-dimensional point, the second three-dimensional point having a second angle corresponding to a first angle of the first three-dimensional point, the third three-dimensional point having a third angle greater than the second angle.

12. A decoding device that decodes three-dimensional points each having a position represented by a distance and an angle, the decoding device comprising:

a processor; and
memory, wherein
using the memory, the processor:
- identifies three-dimensional points that belong to a second processing unit and have been decoded, for inter prediction of a first three-dimensional point belonging to a first processing unit; and
- selects a reference three-dimensional point from the three-dimensional points identified to calculate an inter predicted value of the first three-dimensional point, wherein the three-dimensional points identified include a second three-dimensional point and a third three-dimensional point, the second three-dimensional point having a second angle corresponding to a first angle of the first three-dimensional point, the third three-dimensional point having a third angle greater than the second angle.

* * * * *